United States Patent Office 3,347,910
Patented Oct. 17, 1967

3,347,910
CYCLOALIPHATIC SUBSTITUTED NAPHTHYL-OXY-ALKANOIC ACIDS AND A METHOD FOR THEIR PREPARATION
William A. Bolhofer, Frederick, and John J. Baldwin, Lansdale, Pa., assignors to Merck & Co., Inc., Rahway, N.J., a corporation of New Jersey
No Drawing. Filed Dec. 10, 1964, Ser. No. 417,477
14 Claims. (Cl. 260—520)

It is generally agreed that cholesterol is a contributory factor in the pathogenesis of atherosclerosis because along with other lipids and fibrin it is the substance that accumulates in the arterial intima and subintima and produces arterial corrosion.

It is the purpose of this invention to disclose a new class of pharmacologically active compounds which are characterized by a high degree of hypocholesterolemic activity and which can thus be used to effect a significant decrease in the concentration of cholesterol in blood serum and ameliorate the condition associated with blood lipid deposition.

The products of this invention are nuclear substituted naphthyloxy-alkanoic acids having the following general formula:

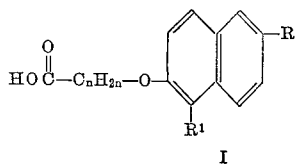

I wherein R represents a cycloaliphatic radical containing from five to six nuclear carbon atoms and which may either be unsubstituted or contain one or more nuclear substituents selected from the group consisting of methylene, cyanomethylene, hydroxy, halogen, lower alkyl, lower alkenyl, lower alkynyl, cyano, hydroxyalkyl, lower alkanoyl, polyfluoro substituted alkenyl, lower akanoyloxy, and oxo; cycloaliphatic radicals illustrative of R include, for example, cycloalkyl, methylene substituted cycloalkyl, cyanomethylene substituted cycloalkyl, hydroxy substituted cycloalkyl, halo substituted cycloalkyl, lower akyl substituted cycloalkyl, hydroxy and lower alkyl substituted cycloalkyl, hydroxy and lower alkenyl substituted cycloalkyl, hydroxy and lower alkynyl substituted cycloalkyl, hydroxy and cyano substituted cycloalkyl, hydroxy and hydroxyalkyl substituted cycloalkyl, hydroxy and lower alkanoyl substituted cycloalkyl, hydroxy and polyfluoroalkenyl substituted cycloalkyl, lower alkanoyl and lower alkanoyloxy substituted cycloalkyl, oxo substituted cycloalkyl, cycloalkenyl, hydroxy substituted cycloalkenyl, hydroxy and lower alkyl substituted cycloalkenyl, hydroxy and lower alkenyl substituted cycloalkenyl, hydroxy and lower alkynyl substituted cycloalkenyl, and oxo substituted cycloalkenyl; $R^1$ represents a member selected from the group consisting of hydrogen and halogen; and —$C_nH_{2n}$— is a lower alkylene radical containing from one to four carbon atoms.

Also included within the scope of this invention are the ester and amide derivatives of the above-described naphthyloxyalkanoic acids (I), which derivatives are conveniently prepared by conventional methods well-known to those having ordinary skill in the art. Thus, for example, the ester derivatives may be prepared by the reaction of an alkanoic acid product (I) of this invention with an alcohol as, for example, with a lower alkyl alcohol to prepare the corresponding esterified derivative or, alternatively, the said alkanoic acid product (I) may be converted to its acid halide by conventional means and treated with an appropriate lower alkanol to produce the desired ester. The amide derivatives of the instant alkanoic acid products (I) may also be prepared via the acid halide by treating the appropriate naphthyloxy-alkanoic acid halide with ammonia or an appropriate mono- or dialkylamine to produce the desired amide. Another method for preparing the said amide derivatives comprises treating an ester of the instant alkanoic acid products, prepared as described above, with ammonia or an appropriate mono- or di-alkylamine to produce the desired amide. These and other equivalent methods for the preparation of the ester and amide derivatives of the instant products will be apparent to one havnig ordinary skill in the art and, to the extent that the said derivatives are both nontoxic and physiologically acceptable to the body system, the said esters and amides are the functional equivalent of the corresponding naphthyloxy-alkanoic acids (I).

This invention also relates to the acid addition salts of the instant nuclear substituted naphthyloxy-alkanoic acids (I), which salts are prepared by the reaction of the said alkanoic acids with a base having a nontoxic, pharmacologically acceptable cation. In general, any base which will form an acid addition salt with a carboxylic acid and whose pharmacological properties will not cause an adverse physiological effect when ingested by the body system is considered as being within the scope of this invention. Suitable bases thus include, for example, the alkali metal and alkaline earth metal hydroxides, carbonates, etc., ammonia, primary, secondary and tertiary amines such as monoalkylamines, dialkylamines, trialkylamines, nitrogen containing heterocyclic amines, for example, piperidine, etc. The acid addition salts thus produced are the functional equivalent of the corresponding alkanoic acid products (I) and one skilled in the art will appreciate that to the extent that the alkanoic acids of the invention are useful in therapy, the variety of acid addition salts embraced by this invention are limited only by the criterion that the bases employed in forming the salts be both nontoxic and physiologically acceptable.

A preferred class of nuclear substituted naphthyloxy-alkanoic acids within the scope of this invention relates to those alkanoic acids having the following formula:

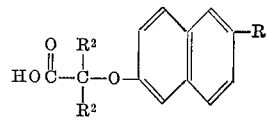

wherein R is a member selected from the group consisting of cycloalkyl containing six nuclear carbon atoms such as cyclohexyl; hydroxy substituted cycloalkyl containing six nuclear carbon atoms such as hydroxy substituted cyclohexyl, for example, 3-hydroxycyclohexyl, 3-hydroxy - 3 - methylcyclohexyl, 3 - hydroxy - 3 - ethyl-cyclohexyl, etc.; and oxo substituted cycloalkyl containing six nuclear carbon atoms such as oxo substituted cyclohexyl, for example, 3-oxocyclohexyl, etc.; and each of the $R^2$ radicals represent similar or dissimilar substituents selected from the group consisting of hydrogen and lower alkyl, as, for example, a lower alkyl radical containing one to two carbon atoms and preferably the methyl radical.

Also included within the preferred embodiment are the acid addition salts, esters and amide derivatives of the nuclear substituted naphthyloxy-alkanoic acids described in the preceding paragraph; for example, the alkali metal and alkaline earth metal salts thereof such as the sodium, potassium or calcium salts, the lower alkyl esters thereof, for example, the corresponding ethyl, propyl, or butyl esters and the corresponding amide derivatives of the above-described compounds, for example, the mono-lower alkyl and di-lower alkyl amido derivatives, such as methylamido, dimethylamido, diethylamido, etc. The above class of compounds exhibits particularly good hypocholesterolemic activity and represents a preferred subgroup of compounds within the scope of this invention.

The compounds of the invention are primarily prepared by either of two alternate routes, the choice of which depends largely upon the character of the alkylene group (i.e., the $-C_nH_{2n}-$ group) in the alkanoic acid product (I). When, for example, the product (I) is a 2-naphthyloxy derivative of a branched chain alkanoic acid as, for example, where

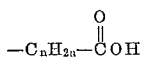

in planar Formula I, supra, is derived from 2-methylpropionic acid (i.e., isobutyric acid) or 2-methyl-butyric acid, the compound is prepared by the reaction of an appropriately substituted naphthol (II) with a ketone (e.g., acetone, butanone, etc.) and chloroform in the presence of a base as, for example, in the presence of sodium hydroxide. Preferably, the base is added to a mixture of the naphthol (II) and ketone reactants and the resulting mixture heated to reflux; the chloroform is then added and the entire mixture refluxed a second time over an extended period. Also, it is most desirable to conduct the reaction in an atmosphere of nitrogen but it should be obvious to those skilled in the art that other, similarly inert, gases may also be employed in an equivalent manner or, under suitable conditions, none at all need be used. The following equation, wherein the base employed is sodium hydroxide and the ketone reactant is acetone, illustrates the reaction:

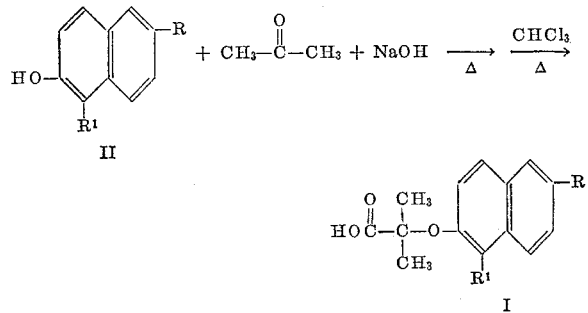

wherein the radicals R and $R^1$ are as defined above.

A second method for preparing the naphthyloxy-alkanoic acids (I) of this invention also comprises etherifying a naphthol (II) but the advantage of this route, as compared with the former, lies in its suitability for preparing both the straight chain, as well as the branched chain, alkanoic acid products (I). Thus, according to this method of preparation an halo substituted derivative of a straight or branched chain alkanoic acid ester is reacted with an appropriately substituted naphthol (II) in the presence of a base and the esterified intermediate thus produced is then hydrolyzed to the desired carboxylic acid (I). In general, the process is conducted in the presence of a solvent, such as ethanol, but it will be apparent to those skilled in the art that any other suitable solvent, such as N,N-dimethylformamide, etc., may also be employed. Suitable basic reagents which may be used in the process include, for example, sodium methoxide, sodium ethoxide, potassium carbonate, sodium hydride, etc. The following equation, wherein the basic reagent employed is sodium ethoxide, illustrates the reaction:

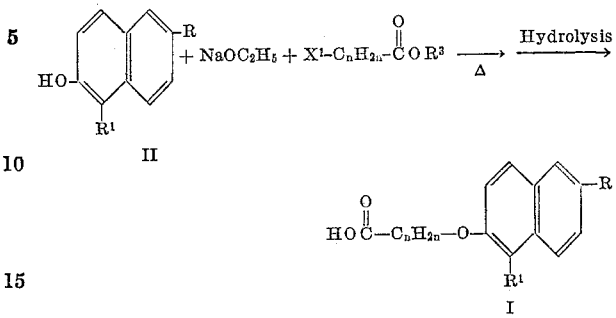

wherein R, $R^1$ and $-C_nH_{2n}-$ are as defined above; $R^3$ is an hydrocarbyl group (i.e., a monovalent organic radical composed solely of carbon and hydrogen) such as lower alkyl, for example, methyl, ethyl, propyl, etc. and $X^1$ is halogen, for example, chloro, bromo, etc. The hydrolysis step in the above equation is conducted in the conventional manner as, for example, by treating the carboxylate intermediate of the process with a base, as, for example, with an aqueous solution of an alkali metal hydroxide, for example, sodium hydroxide, potassium carbonate, etc. and then with an acid, for example, hydrochloric acid, etc., to produce the desired naphthyloxy-carboxylic acid product (I).

A third process for obtaining the naphthyloxy-alkanoic acids (I) of this invention relates to the preparation of a limited group of products containing both an hydroxy and a lower alkyl, lower alkenyl, polyfluoro alkenyl or lower alkynyl group on the same carbon atom of the cycloaliphatic ring. By this route a suitable Grignard reagent, such as a lower alkyl magnesium halide, a lower alkenyl magnesium halide (e.g., vinyl magnesium bromide), a perfluoroalkenyl magnesium halide (e.g., trifluorovinyl magnesium bromide) or a lower alkynyl magnesium halide (e.g., ethynyl magnesium bromide), is reacted with a 6-(3-oxocycloalkyl)-2-naphthyloxy-alkanoic acid or a 6-(3-oxocycloalkenyl)-2-naphthyloxy-alkanoic acid (prepared by either of the preparative methods discussed above), then treated with an aqueous solution of ammonium chloride, and the 6-(3-hydroxy-3-lower alkylcycloaliphatic)-2-naphthyloxy-alkanoic acid, 6-(3-hydroxy-3-lower alkenylcycloaliphatic)-2-naphthyloxy-alkanoic acid, 6-(3-hydroxy-3-perfluoroalkenylcycloaliphatic)-2-naphthyloxy-alkanoic acid or 6-(3-hydroxy-3-lower alkynylcycloaliphatic)-2-naphthyloxy-alkanoic acid thus produced is extracted from the resulting mixture by treatment with a suitable solvent such as chloroform. Preferably, the reaction of the Grignard reagent with the 6-(3-oxocycloaliphatic)-2-naphthyloxy-alkanoic acid is conducted in an inert solvent as, for example, in tetrahydrofuran, although any of the other inert solvents which are usually used in Grignard syntheses may also be employed.

The 6-(3-hydroxy-3-lower alkynylcycloalkyl)-2-naphthyloxy-alkanoic acid obtained by the method described in the preceding paragraph may then be converted, if desired, to the corresponding 6-(3-hydroxy-3-acetylcycloalkyl)-2-naphthyloxy-alkanoic acid by the treatment thereof with mercuric oxide in an aqueous solution of sulfuric acid or, alternatively, the said 6-(3-hydroxy-3-lower alkynylcycloalkyl)-2-naphthyloxy-alkanoic acid may be reacted with mercuric acetate to obtain a 6-(3-acetyl-3-acetoxycycloalkyl)-2-naphthyloxy-alkanoic acid. If desired, the 6-(3-hydroxy-3-acetylcycloalkyl)-2-naphthyloxy-alkanoic acid thus obtained may then be treated with a basic solution of potassium borohydride to produce the corresponding 6-[3-hydroxy-3-(1-hydroxyethyl)cycloalkyl]-2-naphthyloxy-alkanoic acid derivative.

In addition to the two etherification syntheses described above the 6-(3-hydroxycycloalkyl)-2-naphthyloxy-alkanoic acid, 6-(3-oxocycloalkyl)-2-naphthyloxy-alkanoic acid and 6-(3-hydroxycycloalkenyl)-2-naphthyloxy-alkanoic acid products may also be prepared by treating a 6-(3-oxocycloalkenyl)-2-naphthyloxy-alkanoic acid with a suitable reducing agent. Thus, for example, reduction of a 6-(3-oxo-1-cycloalkenyl)-2-naphthyloxy-alkanoic acid with an alkali metal borohydride, such as sodium borohydride, yields the corresponding 6-(3-hydroxy-1-cycloalkenyl)-2-naphthyloxy-alkanoic acid whereas hydrogenation of the same starting material in the presence of a metallic catalyst, such as a 5% palladium on charcoal reagent, produces the corresponding 6-(3-oxocycloalkyl)-2-naphthyloxy-alkanoic acid compound, which, if desired, may then be treated with alkali metal borohydride to obtain the corresponding 6-(3-hydroxycycloalkyl)-2-naphthyloxy-alkanoic acid product. In addition, if desired, the 6 - (3 - hydroxy - 1 - cycloalkenyl) - 2 - naphthyloxy-alkanoic acid, prepared as described above, i.e., by the reduction of a 6-(3-oxo-1-cycloalkenyl)-2-naphthyloxy-alkanoic acid, may also be converted to its 6-(3-hydroxycycloalkyl)-2-naphthyloxy-alkanoic acid analog by treating the former with hydrogen in the presence of a suitable metallic catalyst as, for example, in the presence of nickel. The following equations, wherein the 6-(3-oxocycloalkenyl)-2-naphthyloxy-alkanoic acid reactant employed is a 6-(3-oxocyclohexenyl)-2-naphthyloxy-alkanoic acid (III, infra) illustrate the foregoing reduction syntheses; however, the reactions are illustrative only and it is to be understood that a suitable 6-(3-oxocyclopentenyl)-2-naphthyloxy-alkanoic acid may be substituted for the 6-(3-oxocyclohexenyl)-2-naphthyloxy-alkanoic acid reactant (III) in an otherwise analogous process to obtain the corresponding 6-(3-hydroxycyclopentenyl), 6-(3-oxocyclopentyl) and 6-(3-hydroxycyclopentyl) substituted products:

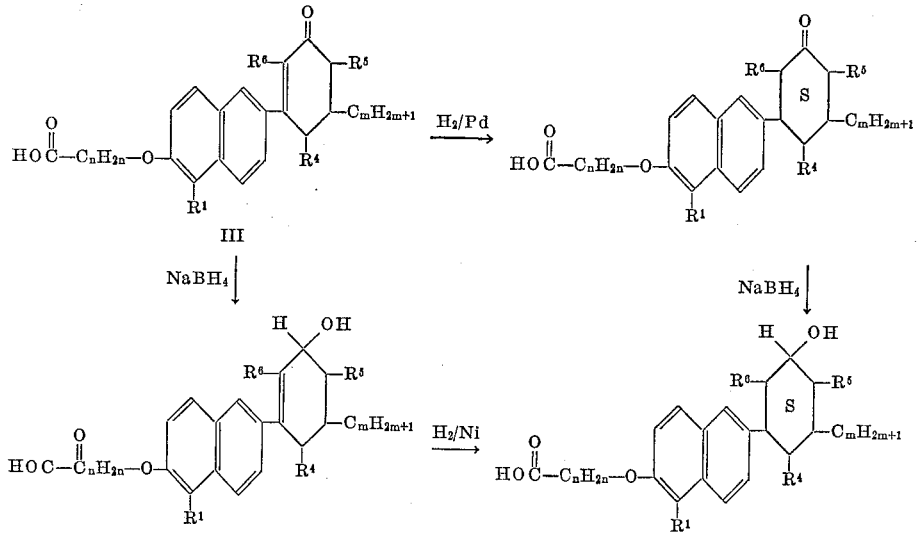

wherein $R^4$, $R^5$ and $R^6$ each represents a member selected from the group consisting of hydrogen and lower alkyl; $m$ is an integer having a value of one to about four and $R^1$ and $-C_nH_{2n}-$ are as defined above. The 6-(3-oxocycloalkenyl)-2-naphthyloxy-alkanoic acid, depicted as planar Formula III in the foregoing equation, is prepared from the corresponding 6-(3-oxocycloalkenyl)-2-naphthol by the condensation thereof with a suitable ketone and chloroform or by treatment with an alkyl haloalkanoate reactant, as described above.

The 6 - methylenecycloalkyl) - 2 - naphthyloxy - alkanoic acid and 6-(cyanomethylenecycloalkyl)-2-naphthyloxy-alkanoic acid products are conveniently prepared from the corresponding 6-(3-oxocycloalkyl)-2-naphthyloxy-alkanoic acid by reaction of the said acid with a lower alkanol, such as methanol or ethanol, to obtain the corresponding alkyl ester derivative and then with triphenylphosphenemethylene or triphenylphosphenecyanomethylene, respectively, in ether. The following equation illustrates the reaction using an alkyl 6-(3-oxocyclohexyl)-2-naphthyloxy-alkanoate as the reactant but it is to be understood that the corresponding alkyl 6-(3-oxocyclopentyl)-2-naphthyloxy-alkanoate derivative may also be employed in an analogous manner to obtain the corresponding methylene and cyanomethylene substituted products:

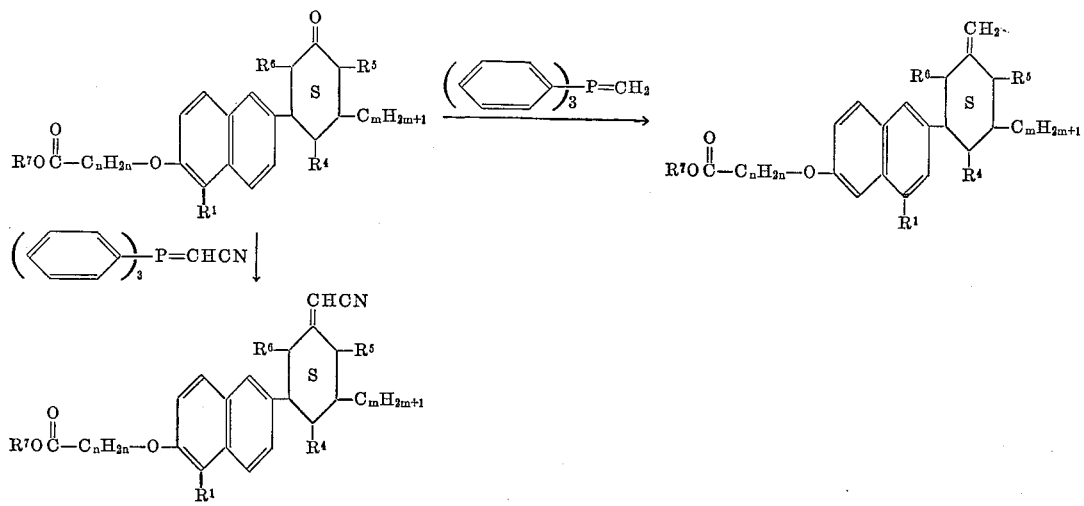

wherein the radicals $R^1$, $R^4$, $R^5$, $R^6$, $-C_nH_{2n}-$ and $m$ are as defined above and $R^7$ represents a lower alkyl radical; and the esterified products produced according to the above process may then be hydrolyzed to the corresponding alkanoic acid products by conventional means.

The 6-(3-hydroxy-3-cyanocycloalkyl)-2-naphthyloxyalkanoic acid products of the invention are also prepared from their corresponding 3-oxocycloalkyl precursors but in this instance by the reaction of a 6-(3-oxocycloalkyl)-2-naphthyloxy-alkanoic acid with acetone cyanohydrin. The product of the reaction is generally obtined from aqueous solution as a crystalline solid and, if desired, may be purified by recrystallization from a suitable alcoholic solvent such as ethanol.

The naphthol starting materials (II) in the foregoing processes are either known compounds or may be prepared by methods well-known to those having ordinary skill in the art. One method of preparation comprises the reaction of a 2-lower alkanoyl-6-alkoxynaphthalene (IV, infra) with dimethylamine hydrochloride and an alkaldehyde, such as formaldehyde or paraformaldehyde, in the presence of hydrochloric acid to produce the corresponding 2-(3-dimethylamino-lower alkanoyl)-6-alkoxynaphthalene hydrochloride (V) and the intermediate thus produced is then reacted with an alkanoalkanoate such as ethyl acetoacetate, ethyl propionylacetate, ethyl propionylpropionate, ethyl α-ethylacetoacetate or ethyl butyrylacetate, in the presence of an alkali metal alkoxide or alkali metal hydroxide in a suitable alcoholic solvent, such as tertiary-butyl alcohol, and the mixture acidified and then treated with an aqueous solution of a base to obtain the corresponding 3-(6-alkoxy-2-naphthyl)-2-cyclohexen-1-one (VI). The alkoxy substituted derivative thus produced is then hydrolyzed by refluxing with aluminum chloride in a suitable solvent, such as xylene, and the resulting mixture treated with a concentrated solution of hydrochloric acid, then with aqueous sodium hydroxide and again with hydrochloric acid to yield the desired 3-(6-hydroxy-2-naphthyl)-2-cyclohexen-1-one (VII). The following equation, wherein the 2-lower alkanoyl-6-alkoxynaphthalene employed is a 2-lower alkanoyl-6-methoxynaphthalene (IV), illustrates this method of preparation:

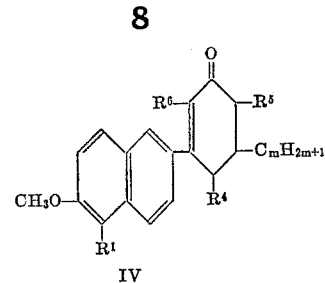

IV

Hydrolysis ↓

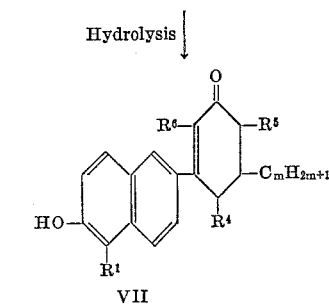

VII wherein $R^1$ is as defined above, $R^4$, $R^5$ and $R^6$ each represents a member selected from the group consisting of hydrogen and lower alkyl, $R^8$ is lower alkyl and $m$ is an integer having a value of one to about four.

The cyclopenten-1-one analogs of the aforementioned 3-(6-hydroxy-2-naphthyl)-2-cyclohexen-1-one (VII) compounds are prepared in a somewhat analogous manner by dissolving a 2-lower-alkanoyl-6-alkoxynaphthalene (IV) in methylene chloride at low temperatures in the range of about $-5$ to about $-10°$ C. and treating the resulting mixture with bromine dissolved in a solution of dioxane and methylene chloride; the 6-(2-bromoalkanoyl)-2-alkoxy-naphthalene (VIII, infra) thus formed is then reacted with an alkanoalkanoate which has been treated with an alkali metal hydride, such as sodium hydried, and the 4-(6-alkoxy-2-naphthyl)-4-oxo-2-alkanoylbutanoic acid ester (IX) thus obtained is treated with an alkali metal hydroxide, such as potassium hydroxide, under nitrogen, to obtain the corresponding 3-(6-alkoxy-2-naphthyl)-2-cyclopenten-1-one (X) derivative. Hydrolysis of the 3-(6-alkoxy-2-naphthyl)-2-cyclopenten-1-one (X) thus formed yields the desired 3-(6-hydroxy-2-naphthyl)-2-cyclopenten-1-one (XI). The following equation, wherein the 2-lower alkanoyl-6-alkoxynaphthalene employed is a 2-lower alkanoyl-6-methoxynaphthalene, illustrates the reaction:

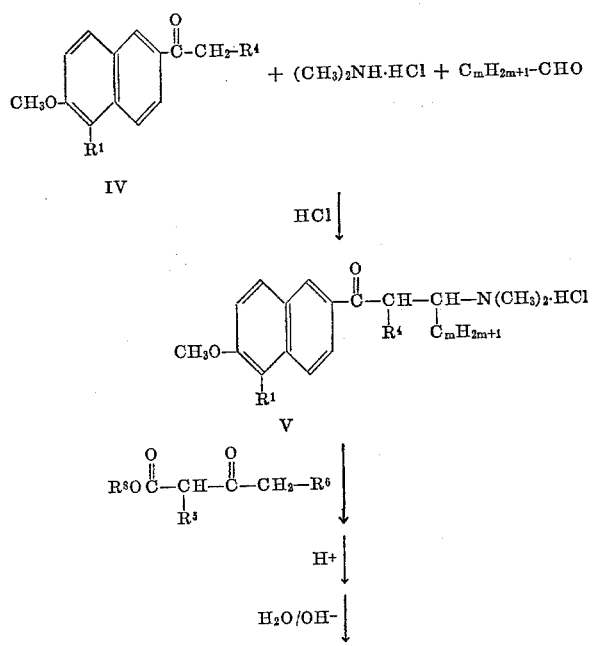

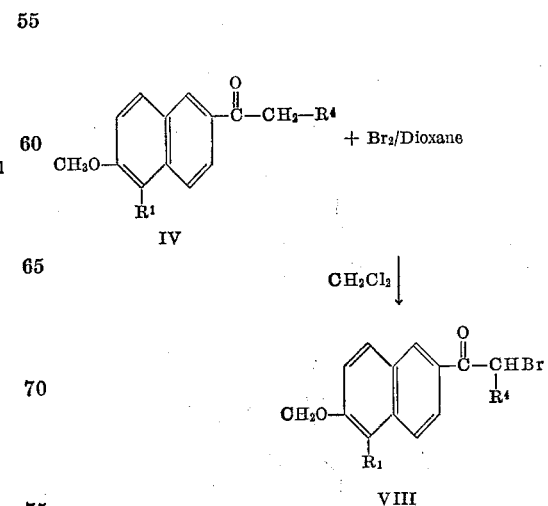

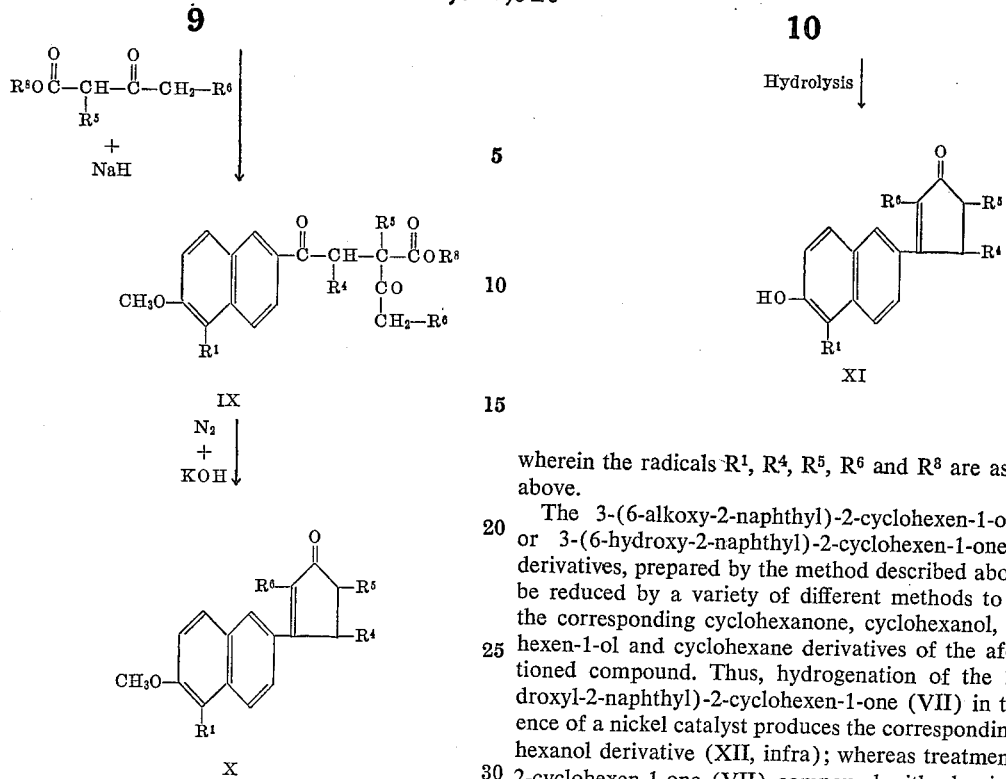

wherein the radicals $R^1$, $R^4$, $R^5$, $R^6$ and $R^8$ are as defined above.

The 3-(6-alkoxy-2-naphthyl)-2-cyclohexen-1-one (VI) or 3-(6-hydroxy-2-naphthyl)-2-cyclohexen-1-one (VII) derivatives, prepared by the method described above, may be reduced by a variety of different methods to prepare the corresponding cyclohexanone, cyclohexanol, 2-cyclohexen-1-ol and cyclohexane derivatives of the aforementioned compound. Thus, hydrogenation of the 3-(6-hydroxyl-2-naphthyl)-2-cyclohexen-1-one (VII) in the presence of a nickel catalyst produces the corresponding cyclohexanol derivative (XII, infra); whereas treatment of the 2-cyclohexen-1-one (VII) compound with aluminum iso-

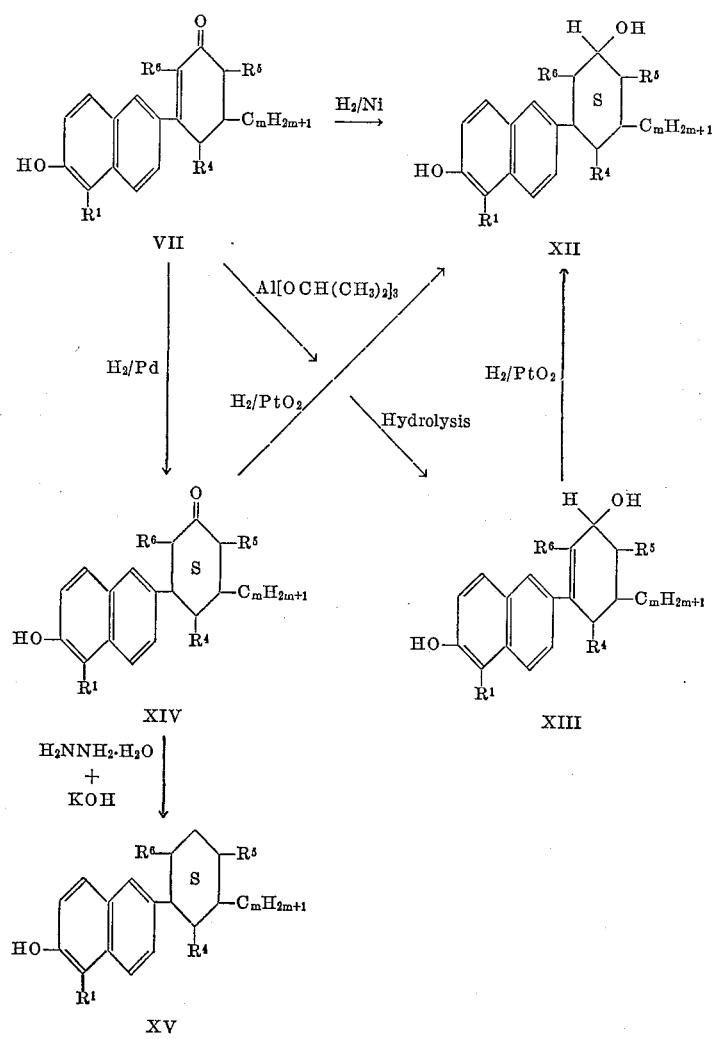

propoxide, followed by the hydrolysis of the resulting intermediate, yields a 2-cyclohexen-1-ol (XIII) and hydrogenation of the 2-cyclohexen-1-one (VII) in the presence of a palladium catalyst produces the corresponding cyclohexanone (XIV) which, if desired, may be reduced further to the cyclohexane derivative (XV) by refluxing with hydrazine hydrate and potassium hydroxide in diethylene glycol according to the Wolff-Kishner method (J. Am. Chem. Soc., vol. 68; page 2487 (1946). Alternatively, the 3-(6-hydroxy-2-naphthyl)cyclohexanol (XII) may also be prepared from the corresponding 2-cyclohexen-1-ol (XIII) and cyclohexanone (XIV) by hydrogenation of the latter derivatives in the presence of a platinum dioxide catalyst wherein $R^1$, $R^4$, $R^5$, $R^6$ and $m$ are as defined above. In addition, the 3-(6-hydroxy-2-naphthyl)cyclohexanol depicted as Compound XII in the foregoing equation may also be prepared by hydrogenation of the 3-(6-hydroxy-2-naphthyl)-2-cyclohexen-1-one derivative (VII) in the presence of a platinum or platinum dioxide catalyst (i.e., an Adams catalyst).

Alternatively, in lieu of the 3-(6-hydroxy-2-naphthyl)-2-cyclohexen-1-one (VII) described in the reduction syntheses above, the corresponding 3-(6-alkoxy-2-naphthyl)-2-cyclohexen-1-one derivative may be employed in a similar manner to obtain the corresponding cyclohexanone, cyclohexanol, 2-cyclohexen-1-ol and cyclohexane derivatives and the alkoxy group in each of the resulting products may then be hydrolyzed in the conventional manner to the corresponding hydroxy moiety. Thus, when 3-(6-methoxy-2-naphthyl)-2-cyclohexen-1-one (VI) is substituted for the 3-(6-hydroxy-2-naphthyl)-2-cyclohexen-1-one (VII) in the above-described reaction and is reduced with hydrogen in the presence of a palladium catalyst the corresponding 3-(6-methoxy-2-naphthyl)cyclohexanone derivative is prepared. Similarly, hydrogenation of the 3-(6-methoxy-2-naphthyl)-2-cyclohexen-1-one (VI) with hydrogen in the presence of a nickel catalyst yields the corresponding cyclohexanol; reduction of the 3-(6-methoxy-2-naphthyl)-2-cyclohexen-1-one (VI) with aluminum isopropoxide and hydrolysis of the intermediate thus obtained yields the corresponding 2-cyclohexen-1-ol derivative; and reduction of the 3-(6-methoxy-2-naphthyl)cyclohexanone with hydrazine hydrate and potassium hydroxide in diethylene glycol produces the corresponding cyclohexane derivative. Also, in a manner similar to that described above for the reduction of 3-(6-hydroxy-2-naphthyl)-2-cyclohexen-1-one (VII) to the corresponding 3-(6-hydroxy-2-naphthyl)cyclohexanol (XII) derivative, the corresponding 3-(6-methoxy-2-naphthyl)-2-cyclohexen-1-one may be treated with hydrogen in the presence of a platinum or platinum dioxide catalyst to produce the corresponding 3-(6-methoxy-2-naphthyl)cyclohexanol analog. The 3-(6-methoxy-2-naphthyl) substituted cyclohexanone, cyclohexanol, 2-cyclohexen-1-ol and cyclohexane derivatives thus produced may then be hydrolyzed to the desired naphthol analogs by conventional means.

Also, in a manner similar to that described above for the reduction of the 3-(6-hydroxy-2-naphthyl)-2-cyclohexen-1-one (VII) and 3-(6-alkoxy-2-naphthyl-2-cyclohexen-1-one (VI) compounds, the corresponding 3-(6-hydroxy-2-naphthyl)-2-cyclopenten-1-one (XVI, infra or XI, supra) and 3-(6-alkoxy-2-naphthyl)-2-cyclopenten-1-one (X) may be reduced to yield the corresponding cyclopentanone (XVII), cyclopentanol (XVIII), 2-cyclopenten-1-ol (XIX) and cyclopentane (XX) derivatives.

The following equations illustrate these reduction syntheses; wherein the cyclopenten-1-one-starting material employed in a 3-(6-hydroxy-2-naphthyl)-2-cyclopenten-1-one:

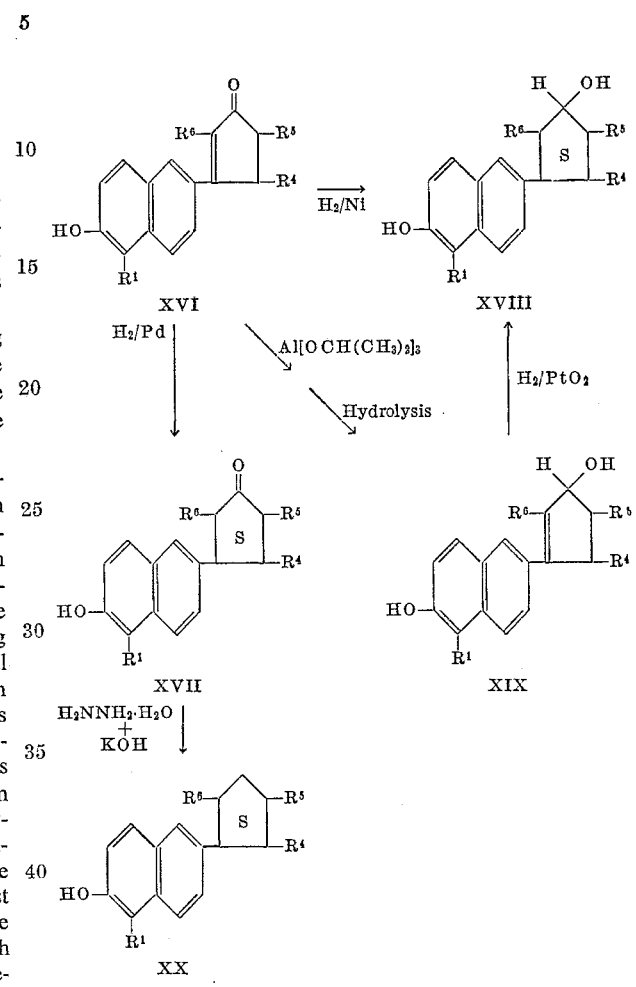

wherein $R^1$, $R^4$, $R^5$ and $R^6$ are as defined above. When 3-(6-methoxy-2-naphthyl)-2-cyclopenten-1-one (X) is employed in the foregoing reduction syntheses, in lieu of the 3-(6-hydroxy-2-naphthyl)-2-cyclopenten-1-one (XVI) there described, and the reduction reactions are conducted in a manner otherwise analogous to that described above, the corresponding 3-(6-methoxy-2-naphthyl) substituted cyclopentanone, cyclopentanol, 2-cyclopenten-1-ol and cyclopentane derivatives are prepared. The said derivatives thus produced may then be hydrolyzed in the conventional manner to convert the methoxy group to hydroxy and produce the desired products.

Those naphthol starting materials which are 6-halocycloalkyl-2-naphthols, and which correspond to planar Formula II, supra, wherein R is an halo substituted cycloalkyl radical, are conveniently prepared by known halogenation methods. Thus, for example, when a suitable 3-(6-alkoxy-2-naphthyl)cycloalkanol, such as a 3-(6-methoxy-2-naphthyl)cyclohexanol (XXI) is treated with a suitable halogenating agent as, for example, with hydrogen iodide, hydrogen chloride, dry hydrogen bromide, sulfur tetrafluoride or other reagent capable of replacing the hydroxy radical thereof with halogen, the corresponding 6-(3-halocyclohexyl)-2-naphthol compound (XXII and XXIII, infra) is obtained. The following equation, wherein the 3-(6-alkoxy-2-naphthyl)cycloalkanol reactant is a 3-(6-methoxy-2-naphthyl)cyclohexanol, illustrates this method of preparation:

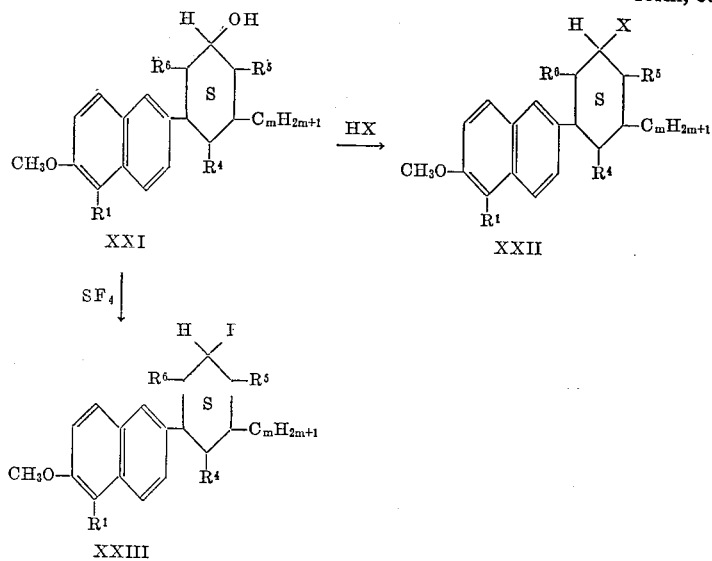

wherein $R^1$, $R^4$, $R^5$, $R^6$ and $m$ are as defined above, X is halogen, for example, iodo, chloro or bromo, and HX is an halogenating agent such as hydrogen iodide, hydrogen chloride or dry hydrogen bromide. The 2-methoxy-6-(3-halocyclohexyl)naphthalene thus produced may then be hydrolized to the corresponding naphthol analog (II) by conventional means. Similarly, when a 3-(6-methoxy-2-naphthyl)cyclopentanol is substituted for the 3-(6-methoxy-2-naphthyl)cyclohexanol (XXI) of the foregoing equation and treated with hydrogen iodide, hydrogen chloride, dry hydrogen bromide or sulfur tetrafluoride in an otherwise analogous manner the corresponding 6-(3-halocyclopentyl)-2-naphthol derivatives are prepared.

The 1-halo-2-naphthol starting materials, such as are represented by planar Formula II, supra, wherein the radical $R^1$ is halogen, are conveniently prepared by the choice of a suitably substituted halo reactant in the preparative methods discussed above or, alternatively, by the selective halogenation of an appropriate 2-naphthol compound. According to this latter method an appropriate 6-cycloaliphatic-2-naphthol, such as 6-cyclopentyl-2-naphthol or the 6-cyclohexyl substituted analog thereof, is treated with an halogenating agent which will substitute halogen for hydrogen at the 1-position of the naphthalene ring without effecting a similar displacement at other positions on the naphthalene nucleus or on the 6-cycloaliphatic ring. Selective halogenating agents which we have found to be suitable in the process include, for example, tertiary butyl hypochlorite, bromine in chloroform, etc.

To form those naphthol reactants (II) containing both an hydroxy and lower alkyl group on the same carbon atom of the cyclohexyl and cyclopentyl nuclei or on the same carbon atom of the cyclohexenyl and cyclopentenyl nuclei it is necessary to first react an appropriate 3-(6-hydroxy-2-naphthyl)cycloalkanone or an appropriate 3-(6-hydroxy-2-naphthyl)-2-cycloalken-1-one with a lower alkyl Grignard reagent, prepared by reacting magnesium turnings and a lower alkyl halide in ethyl ether or in tetrahydrofuran (THF), and then treat the resulting adduct thus produced with an aqueous solution of ammonium chloride to hydrolyze the said intermediate to the desired gem product. Similarly, the 6-alkoxy analogs of the aforementioned 3-(6-hydroxy-2-naphthyl)cycloalkanone and 3-(6-hydroxy-2-naphthyl)-2-cycloalken-1-one reactants may be employed in the Grignard reaction and the 1-lower alkyl-3-(6-methoxy-2-naphthyl)cycloalkanol and the 1-lower alkyl-3-(6-methoxy-2-naphthyl)-2-cycloalken-1-ol products thus produced may then be hydrolyzed by conventional means to the desired 6-hydroxy derivatives. The following equations, wherein the starting materials employed are a 3-(6-methoxy-2-naphthyl)cyclohexanone (XXIV) and a 3-(6-methoxy-2-naphthyl)cyclohexen-1-one (XXV) illustrate the reaction but it is to be understood that the reaction is illustrative only and that the corresponding cyclopentanone and cyclopenten-1-one compounds may also be employed in an analogous manner:

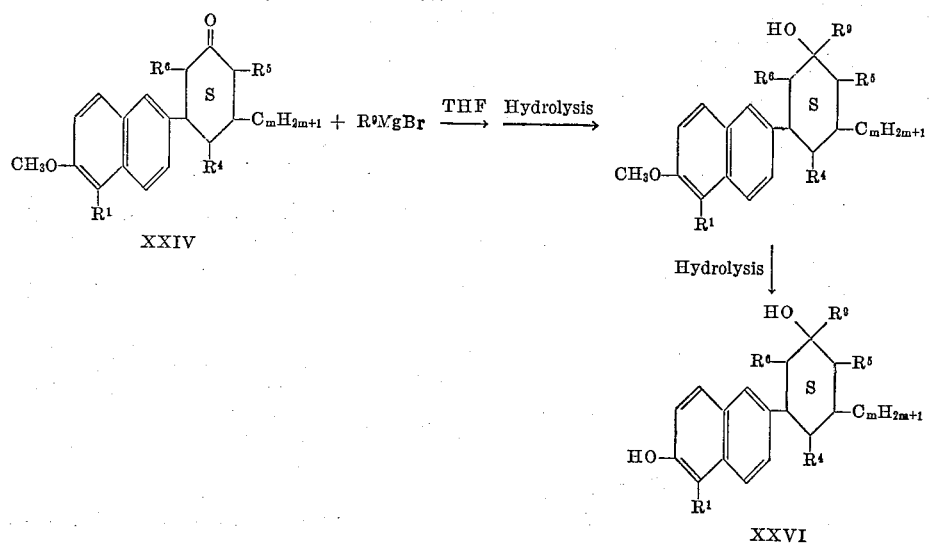

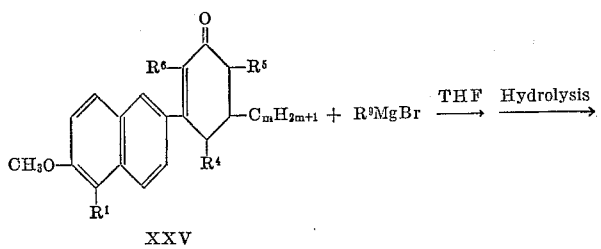

XXV

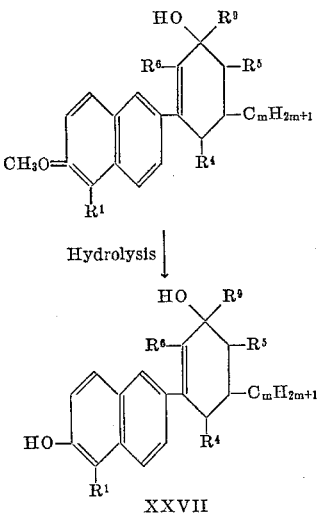

XXVII wherein $R^1$, $R^4$, $R^5$, $R^6$ and $m$ are as defined above and $R^9$ represents a lower alkyl radical.

In a manner similar to that described above for preparing the gem-hydroxy and lower alkyl substituted cycloalkyl and cycloalkenyl derivatives of the naphthol reactant (II), the gem-hydroxy-lower alkenyl, gem-hydroxy-polyfluoroalkenyl and gem-hydroxy-lower alkynyl substituted cyclopentane, cyclohexane, cyclopentene and cyclohexene derivatives of the naphthol (II) may also be prepared. Thus, by substituting an appropriate alkenyl magnesium bromide, such as a vinyl magnesium bromide or trifluorovinyl magnesium bromide, or by substituting an appropriate lower alkynyl magnesium bromide, for the alkyl magnesium bromide described in the foregoing paragraph and following the Grignard reaction described therein, the corresponding gem-hydroxy-alkenyl, gem-hydroxy-polyfluoroalkenyl and gem-hydroxy-alkynyl substituted derivatives of the 6-cycloalkyl and 6-cycloalkenyl naphthols may be prepared.

The gem-hydroxy and cyano substituted cycloalkyl derivatives of the naphthol reactants are prepared by the condensation of hydrogen cyanide or, a cyanohydrin, such as acetone cyanohydrin, with a suitable 3-(6-methoxy-2-naphthyl)cyclohexanone, 3-(6-methoxy-2-naphthyl)cyclopentanone or the corresponding 3-(6-hydroxy-2-naphthyl)cyclohexanone and 3 - (6 - hydroxy-2-naphthyl)cyclopentanone analogs thereof. The following equation illustrates the reaction employing hydrogen cyanide and a reactant selected from the group consisting of a 3-(6-methoxy-2-naphthyl)cyclohexanone and a 3-(6-hydroxy-2-naphthyl)cyclohexanone but, it is to be understood that the corresponding 3-(6-methoxy-2-naphthyl)cyclopentanone and 3-(6-hydroxy-2-naphthyl)cyclopentanone derivatives may be substituted for the former cyclohexanone reactant to obtain the corresponding gem-hydroxy and cyano substituted cyclopentyl derivatives:

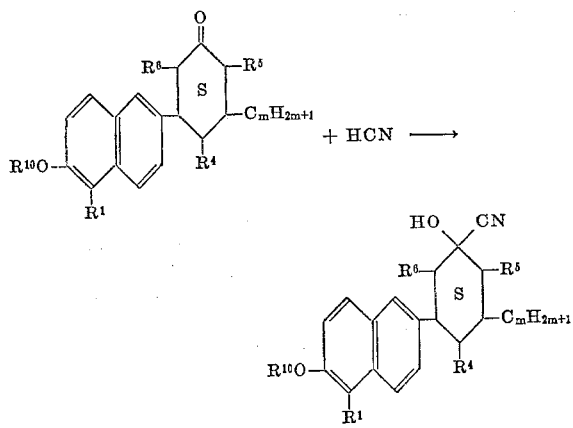

wherein the radicals $R^1$, $R^4$, $R^5$, $R^6$ and $m$ are as defined above and $R^{10}$ is a member selected from the group consisting of hydrogen and methyl and, when $R^{10}$ is methyl the resulting etherified intermediate thus produced is converted to the corresponding naphthol by hydrolyzing the said ether in the conventional manner.

The gem-hydroxy and lower alkanoyl substituted 6-cycloalkyl-2-naphthols are also conveniently prepared by treating an appropriate gem-hydroxy and lower alkynyl substituted derivative of a 6-cycloalkyl-2-naphthol, prepared as described above, with a mixture of mercuric oxide and sulfuric acid. The following equation, wherein the naphthol reactant employed is a 6-(3-hydroxy-3-ethynylcyclohexyl)-2-naphthol (XXVIII), illustrates the reaction:

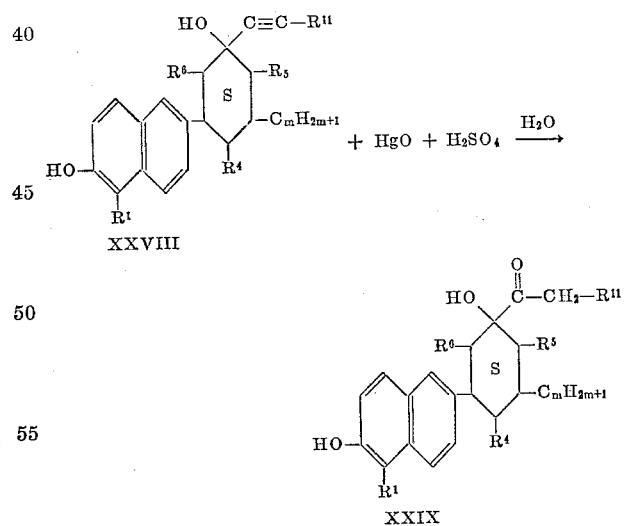

wherein $R^1$, $R^4$, $R^5$, $R^6$ and $m$ are as defined above and $R^{11}$ is a lower alkyl radical. In a similar manner, a gem-hydroxy and lower alkynyl substituted 6-cyclopentyl-2-naphthol may be substituted for the corresponding cyclohexyl reactant depicted as planar Formula XXVIII, supra, and the reaction conducted in a manner analogous to that described above to produce the corresponding gem-hydroxy and lower alkanoyl substituted 6-cyclopentyl-2-naphthol compounds.

The gem-hydroxy and lower alkynyl substituted derivatives of 6-cyclohexyl-2-naphthol, depicted above as Formula XXVIII, may also be treated with a mercuric alkanoate, such as with mercuric acetate in a solution of the corresponding alkanoic acid, and then diluted with water to produce the corresponding gem-lower alkanoyl and lower alkanoyloxy derivative of the 6-cyclohexyl-2-naphthol compound (XXX, infra):

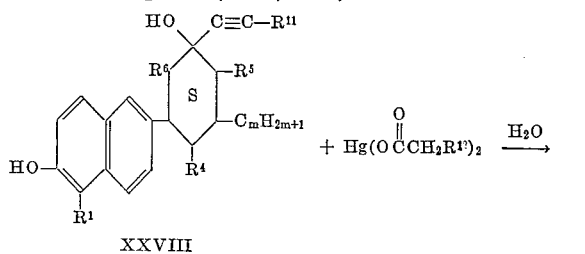

XXVIII

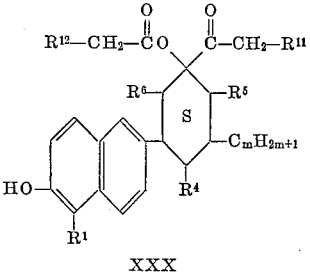

XXX wherein $R^1$, $R^4$, $R^5$, $R^6$, $R^{11}$ and $m$ are as defined above and $R^{12}$ represents a lower alkyl radical. Also, in a similar manner, a gem-hydroxy and lower alkynyl substituted derivative of 6-cyclopentyl-2-naphthol may be substituted for the corresponding gem-hydroxy and lower alkynyl substituted 6-cyclohexyl-2-naphthol depicted above (Formula XXVIII) to produce the corresponding gem-lower alkanoyl and lower alkanoyloxy-cyclopentyl substituted 2-naphthol compound.

Those 6-cycloalkyl-2-naphthols containing both an hydroxy and hydroxyalkyl group on the cycloalkyl nucleus are conveniently prepared from their corresponding 6-(3-hydroxy-3-alkanoyl-cycloalkyl)-2-naphthol analogs, prepared as described above, by the reduction thereof with potassium borohydride. Preferably, the reaction is conducted in a slightly basic medium as, for example, in the presence of an aqueous solution of sodium hydroxide. The following equation, wherein the 6-cycloalkyl-2-naphthol employed is a 6-(3-hydroxy-3-alkanoyl-cyclohexyl)-2-naphthol (XXIX), illustrates the reaction:

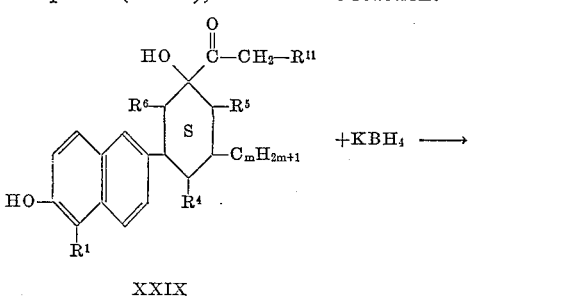

XXIX

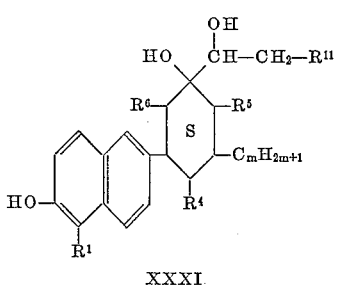

XXXI wherein the radicals $R^1$, $R^4$, $R^5$, $R^6$, $R^{11}$ and $m$ are as defined above. The 3-(6-hydroxy-2-naphthyl)-1-hydroxyalkyl-1-cyclopentanol analog of the foregoing cyclohexanol derivative (XXXI, supra) is prepared in a similar manner by substituting an appropriate gem-hydroxy and lower alkanoyl substituted derivative of 6-cyclopentyl-2-naphthol for the corresponding cyclohexyl derivative (XXIX) described in the foregoing equation.

The naphthyloxyalkanoic acids (I) of the invention are generally obtained as crystalline solids and, if desired, may be purified by recrystallization from a suitable solvent. Suitable solvents include, for example, dipropyl ketone, heptane, butyl chloride and dioxane.

The examples which follow illustrate the method of preparing the naphthyloxyalkanoic acids (I) of the invention as well as the intermediates necessary for their preparation. However, the examples are illustrative only and it will be apparent to those having ordinary skill in the art that all of the products embraced by Formula I, supra, may also be prepared in an analogous manner by substituting the appropriate starting materials for those as set forth in the examples.

EXAMPLE 1

*6-(3-oxo-1-cyclohexenyl)-2-naphthyloxyacetic acid*

3-(6-hydroxy-2-naphthyl)-2-cyclohexen-1-one (9 g., 0.038 mole) is added to a solution of 0.040 mole of sodium ethoxide in 200 ml. of ethyl alcohol. Ethyl bromoacetate (7.7 g., 0.046 mole) is added and the solution is heated under reflux for four hours. Aqueous 1 N sodium hydroxide (55 ml.) is added and heating under reflux is continued for 20 minutes. The alcohol is then removed from the reaction mixture by evaporation under reduced pressure and the mixture is acidified and 5.29 g. of solid 6-(3-oxo-1-cyclohexenyl)-2-naphthyloxyacetic acid is obtained, M.P. 219–224° C. Final purification is achieved by recrystallization from dioxane, M.P. 222–225° C.

EXAMPLE 2

*2-methyl-2-(6-cyclohexyl-2-naphthyloxy)propionic acid*

6-cyclohexyl-2-naphthol (13.6 g., 0.06 mole) is dissolved in 125 ml. of acetone in a 300 ml. three-necked flask and 12 g. (0.30 mole) of sodium hydroxide is added. A nitrogen atmosphere is maintained and the solution is heated to reflux. Chloroform (7.2 ml., 0.09 mole) is slowly added (with outside heat source removed) and when the exothermic reaction begins to subside, the mixture is stirred and heated under reflux for two hours. The acetone is removed by concentration under reduced pressure and 300 ml. of water is added to the residue. A sodium salt separates which is collected, suspended in water and acidified. Crude 2-methyl-2-(6-cyclohexyl-2-naphthyloxy)propionic acid is obtained, and it is dissolved in ether and then treated with saturated aqueous sodium carbonate to form the sodium salt of 2-methyl-2-(6-cyclohexyl-2-naphthyloxy)propionic acid. The sodium salt is collected, suspended in water and acidified to yield purified 2-methyl-2-(6-cyclohexyl-2-naphthyloxy)propionic acid. Recrystallization from heptane yields 10.2 g. of pure product, M.P. 119–120.5° C.

EXAMPLE 3

*2-methyl-2-[6-(3-hydroxycyclohexyl)-2-naphthyloxy]propionic acid*

A solution of 3-(6-hydroxy-2-naphthyl)cyclohexanol (15.0 g., 0.062 mole) in 75 ml. of acetone is placed in a three-necked flask with a nitrogen atmosphere. Sodium hydroxide (12 g., 0.30 mole) is added and the mixture is heated under reflux for 30 minutes; chloroform (0.09 mole) is then added and refluxing is continued for 3½ hours. The solvent is removed by evaporation in vacuo, water is added to the residue and the resulting solution is extracted with ether and the extract discarded. The alkaline aqueous phase is acidified and extracted with ether. The ether extract is shaken with a saturated aqueous solution of sodium bicarbonate and the sodium salt of 2-methyl - 2 - [6 - (3 - hydroxycyclohexyl) - 2 - naphthyloxy]propionic acid separates. After collection of the salt by filtration, it is suspended in water and acidified to yield 8.9 g. of product. Recrystallization from dipropyl ketone yields 8.1 g. of pure 2-methyl-2-[6-(3-hydroxycyclohexyl)-2-naphthyloxy]propionic acid, melting at 173–175° C.

EXAMPLE 4

*2-methyl-2-[6-(3-oxocyclohexyl)-2-naphthyloxy] propionic acid*

3-(6-hydroxy-2-naphthyl)cyclohexanone (16 g., 0.0667 mole) is dissolved in 250 ml. of acetone in a 500 ml. three-necked flask equipped with a two-necked adapter and fitted with a stirrer, condenser, dropping funnel and nitrogen inlet tube. The reaction is carried out in an atmosphere of nitrogen. Sodium hydroxide (13.3 g., 0.333 mole) is added and the mixture is heated to reflux temperature, chloroform (10 g., 0.0838 mole) dissolved in 25 ml. of acetone is added to the reaction dropwise over a 20-minute period and then heating at the reflux temperature is continued for four hours. The solvent is removed by concentration under vacuum and the residue is dissolved in a mixture of 450 ml. of water and 150 ml. of ether. The layers are separated and the aqueous layer is acidified with hydrochloric acid and extracted with ether. The original ether extract is extracted with saturated sodium carbonate and the aqueous solution is acidified and extracted with ether. The two ether solutions are combined and evaporated to yield 18.5 g. of residue. Crystallization from carbon tetrachloride and recrystallization from butyl chloride yields 4.6 g. of 2-methyl-2-[6-(3-oxocyclohexyl)-2-naphthyloxy]propionic acid, M.P. 127–128.5° C.

EXAMPLE 5

*2-methyl-2-[6-(3-hydroxy-3-methylcyclohexyl)-2-naphthyloxy]propionic acid*

A Grignard reagent is prepared from 3.64 g. (0.15 mole) of magnesium turnings and 21.3 g. (0.15 mole) of methyl iodide in 60 ml. of ethyl ether in nitrogen atmosphere. To this is added a solution of 2-methyl-2-[6-(3-oxocyclohexyl)-2-naphthyloxy]propionic acid (16.3 g., 0.05 mole) in tetrahydrofuran and the mixture is stirred at reflux for 20 hours. The reaction is cooled, aqueous ammonium chloride is added and the tetrahydrofuran is removed under reduced pressure. The product is insoluble in the aqueous solution remaining and is extracted with chloroform. The solvent is then evaporated and 2 - methyl - 2 - [6-(3-hydroxy-3-methylcyclohexyl)-2-naphthyloxy]propionic acid crystallizes.

EXAMPLE 6

*6-(3-hydroxy-1-cyclohexenyl)-2-naphthyloxyacetic acid*

By substituting 3-(6-hydroxy-2-naphthyl)-2-cyclohexen-1-ol for the 3-(6-hydroxy-2-naphthyl)-2-cyclohexen-1-one of Example 1, and following substantially the same procedure described therein, the compound 6-(3-hydroxy-1-cyclohexenyl)-2-naphthyloxy-acetic acid is prepared.

EXAMPLE 7

*2-methyl-2-[6-(3-hydroxycyclohexyl)-2-naphthyloxy] propionic acid*

To a solution of 2-methyl-2-[6-(3-oxocyclohexyl)-2-naphthyloxy]propionic acid (7.9 g., 0.0241 mole), prepared by the procedure of Example 4, in 200 ml. of methanol, is added 0.03 mole sodium hydroxide in 5 ml. of water. A solution of 0.06 mole of potassium borohydride in 40 ml. of water containing 0.25 ml. of 10% sodium hydroxide is added dropwise. The solution is stirred for seven hours. The solvent is removed under reduced pressure and the residue treated with dilute hydrochloric acid and ether. The ether layer is separated and concentrated and the residue crystallized from dipropyl ketone to give 2-methyl-2-[6-(3-hydroxycyclohexyl)-2-naphthyloxy]propionic acid, melting at 173–175° C.

EXAMPLE 8

*2-methyl-2-[6-(3-hydroxy-3-cyanocyclohexyl)-2-naphthyloxy]propionic acid*

A solution of 2-methyl-2-[6-(3-oxocyclohexyl)-2-naphthyloxy]propionic acid (8.5 g., 0.026 mole) in 0.12 mole of acetone cyanohydrin is allowed to stand in vacuo for 18 hours. The reaction mixture is stirred with water and the product which separates is collected and crystallized from an alcoholic solvent to obtain 2-methyl-2-[6-(3-hydroxy - 3 - cyanocyclohexyl)-2-naphthyloxy]propionic acid.

EXAMPLE 9

*2-methyl-2-[6-(3-hydroxy-3-ethylcyclohexyl)-2-naphthyloxy]propionic acid*

A Grignard reagent is prepared from 4.37 g. (0.18 mole) of magnesium turnings and 19.6 g. (0.18 mole) of bromoethane in 50 ml. of tetrahydrofuran under nitrogen atmosphere. To this reagent is added a solution of 2-methyl - 2-[6-(3-oxycyclohexyl)-2-naphthyloxy]propionic acid (9.6 g., 0.0295 mole), prepared as described in Example 4, in 50 ml. of tetrahydrofuran. After stirring at reflux under nitrogen for 22 hours the mixture is hydrolyzed with an aqueous solution of ammonium chloride. Tetrahydrofuran is removed under reduced pressure and the oil is taken up in ether, washed and dried. Removal of the ether gives an oil which is identified as 2-methyl-2-[6-(3-hydroxy-3-ethylcyclohexyl)-2-naphthyloxy]propionic acid.

EXAMPLE 10

*2-ethyl-2-[6-(3-hydroxy-3-methylcyclohexyl)-2-naphthyloxy]propionic acid*

A Grignard reagent is prepared from 3.64 g. (0.15 mole) of magnesium turnings and 21.3 g., (0.15 mole) of methyl iodide in 60 ml. of anhydrous ether. To this reagent is added a solution of 2-methyl-2-[6-(3-oxocyclohexyl)-2-naphthyloxy]propionic acid (9.6 g., 0.0295 mole), prepared as described in Example 4, in 200 ml. of ether. The mixture is stirred at reflux for six hours, after which the cold reaction mixture is hydrolyzed with an aqueous solution of ammonium chloride. The ether layer is separated, washed and then dried. Removal of the ether gives a product identified as 2-methyl-2-[6-(3-hydroxy-3-methylcyclohexyl)-2-naphthyloxy]propionic acid.

EXAMPLE 11

*6-(3-hydroxy-3-vinyl-1-cyclohexenyl)-2-naphthyloxyacetic acid*

Vinylmagnesium bromide is prepared from 7.28 g. (0.31 mole) of magnesium turnings and 32.1 g. (0.3 mole) of vinyl bromide in 70 ml. of tetrahydrofuran. Then 6-(3-oxo-1-cyclohexenyl)-2-naphthyloxyacetic acid (19.4 g., 0.0655 mole), prepared as described in Example 1, in 100 ml. of tetrahydrofuran is added over one hour with stirring. The reaction is stirred under nitrogen for 16 hours overnight at room temperature. The cooled mixture is hydrolyzed with an aqueous solution of ammonium chloride and the tetrahydrofuran is removed under reduced pressure. Extraction with ether gives a product identified as 6 - (3 - hydroxy-3-vinyl-1-cyclohexenyl)-2-naphthyloxyacetic acid.

EXAMPLE 12

*2-methyl-2-[6-(3-hydroxy-3-vinylcyclohexyl)-2-naphthyloxy]propionic acid*

Vinylmagnesium bromide is prepared from 6.70 g. (0.275 mole) of magnesium turnings and 26.7 g. (0.25 mole) of vinyl bromide in 60 ml. of tetrahydrofuran. Then 2 - methyl-2-[6-(3-oxocyclohexyl)-2-naphthyloxy] propionic acid (16.3 g., 0.05 mole), prepared as described in Example 4, in 100 ml. of tetrahydrofuran is added over one hour with stirring. The mixture is stirred for 16 hours overnight at room temperature under nitrogen. The cooled mixture if hydrolyzed with an aqueous solution of ammonium chloride and the tetrahydrofuran is removed under reduced pressure. Extraction with ether gives 2 - methyl - 2-[6-(3-hydroxy-3-vinylcyclohexyl)-2-naphthyloxy]propionic acid.

EXAMPLE 13

*2-methyl-2-[6-(3-hydroxy-3-trifluorovinylcyclohexyl)-2-naphthyloxy]-propionic acid*

Trifluorovinylmagnesium bromide is prepared at −10° C. by bubbling 16.1 g. (0.1 mole) of bromotrifluoroethylene into a sirred mixture of 2.68 g. (0.105 mole) of magnesium turnings in 100 ml. of tetrahydrofuran. The mixture is stirred at −10° C. for 2½ hours. Then a solution of 8.2 g. (0.025 mole) of 2-methyl-2-[6-(3-oxocyclohexyl)-2-naphthyloxy]propionic acid in 100 ml. of tetrahydrofuran is added over one hour and the mixture is stirred −10° C. for 16 hours overnight. Then the mixture is allowed to warm to room temperature over 4½ hours and hydrolyzed with an aqueous solution of ammonium chloride. The tetrahydrofuran is removed under reduced pressure. Extraction with ether gives 2-methyl - 2 - [6-(3-hydroxy-3-trifluorovinylcyclohexyl)-2-naphthyloxy]propionic acid.

EXAMPLE 14

*6-(3-oxo-1-cyclopentenyl)-2-naphthyloxyacetic acid*

By substituting 3 - (6 - hydroxy - 2-naphthyl)-2-cyclopenten-1-one for the 3-(6-hydroxy-2-naphthyl)-2-cyclohexen-1-one of Example 1, and following substantially the procedure described therein, the compound 6-(3-oxo-1-cyclopentenyl)-2-naphthyloxyacetic acid is prepared.

EXAMPLE 15

*6-(3-hydroxy-3-ethynyl-1-cyclopentenyl)-2-naphthyloxyacetic acid*

Ethylmagnesium bromide is prepared from 3.07 g. (0.138 mole) of magnesium turnings and 13.6 g. (0.125 mole) of ethyl bromide in 100 ml. of tetrahydrofuran. This solution is added to 150 ml. of tetrahydrofuran saturated with acetylene over 1¾ hours with stirring and with a continuous stream of acetylene bubbling into the mixture. Then 6-(3-oxo-1-cyclopentenyl)-2-naphthyloxyacetic acid (7.05 g., 0.025 mole), prepared as described in Example 14, in 50 ml. of tetrahydrofuran is added over ½ hour. The mixture is stirred for 44 hours at room temperature. Then the mixture is hydrolyzed with an aqueous solution of ammonium chloride and the tetrahydrofuran is removed under reduced pressure. Extraction with ether-benzene gives 6-(3-hydroxy-3-ethynyl-1-cyclopentenyl)-2-naphthyloxyacetic acid.

EXAMPLE 16

*2-methyl-2-[6-(3-hydroxy-3-ethynylcyclohexyl)-2-naphthyloxy]-propionic acid*

Ethylmagnesium bromide is prepared from 7.60 g. (0.31 mole) of magnesium turnings and 29.92 g. (0.275 mole) of ethyl bromide in 200 ml. of tetrahydrofuran. This solution is added to 150 ml. of tetrahydrofuran saturated with acetylene over 1¾ hours with stirring and with a continuous stream of acetylene bubbling into the mixture. Then 2 - methyl - 2 - [6-(3-oxocyclohexyl)-2-naphthyloxy]propionic acid (16.3 g., 0.05 mole) in 200 ml. of tetrahydrofuran is added over ½ hour and the mixture is stirred at room temperature for 65 hours under nitrogen. The mixture is cooled and hydrolyzed with an aqueous solution of ammonium chloride and the tetrahydrofuran is removed under reduced pressure. Ether extraction yields 2-methyl-2-[6-(3-hydroxy-3-ethynylcyclohexyl)-2-naphthyloxy]propionic acid.

EXAMPLE 17

*6-(3-hydroxy-3-ethynyl-1-cyclohexenyl)-1-naphthyloxyacetic acid*

Ethylmagnesium bromide is prepared from 7.60 g. (0.31 mole) of magnesium turnings and 29.92 g. (0.275 mole) of ethyl bromide in 200 ml. of tetrahydrofuran. This solution is added to 150 ml. of tetrahydrofuran saturated with acetylene over 1¾ hours with stirring and with continuous bubbling in of acetylene, under nitrogen. 6-(3-oxo-1-cyclohexenyl)-2-naphthyloxyacetic acid (11.6 g., 0.039 mole), prepared as described in Example 1, in 300 ml. of tetrahydrofuran is then added to the solution of ethyl magnesium bromide over a 15-minute period. The mixture is stirred at room temperature for 65 hours, cooled and hydrolyzed with a solution of ammonium chloride. The tetrahydrofuran is removed under reduced pressure and replaced by ether. The ether layer is then washed, dried and concentrated to give a solid identified as 6 - (3 - hydroxy-3-ethynyl-1-cyclohexenyl)-1-naphthyloxyacetic acid.

EXAMPLE 18

*6-(3-hydroxy-3-methyl-1-cyclopentenyl)-2-naphthyloxyacetic acid*

Methylmagnesium iodide is prepared from 2.43 g. (0.10 mole) of magnesium turnings and 14.20 g. (0.10 mole) of methyl iodide in 100 ml. of ether. Then a solution of 6-(3-oxo-1-cyclopentenyl)-2-naphthyloxyacetic acid (4.37 g., 0.0155 mole), prepared as described in Example 14, in 200 ml. of ether and 100 ml. of tetrahydrofuran is added over 3½ hours with stirring. The mixture is stirred at room temperature under nitrogen, the cooled solution hydrolyzed with an aqueous solution of ammonium chloride and the organic solvents are removed under reduced pressure. Extraction with ether gives a solid identified as 6 - (3-hydroxy-3-methyl-1-cyclopentenyl)-2-naphthyloxyacetic acid.

EXAMPLE 19

*6-(3-hydroxy-3-methyl-1-cyclohexenyl)-2-naphthyloxyacetic acid*

A solution of 6-(3-oxo-1-cyclohexenyl)-2-naphthyloxyacetic acid (8.9 g., 0.03 mole) in 100 ml. of dry ether is added over 0.5 hour to a solution of methyl magnesium iodide (0.15 mole) in 100 ml. of dry ether. After refluxing for four hours the reaction mixture is poured onto 500 ml. of a saturated solution of aqueous ammonium chloride and 6 - (3-hydroxy-3-methyl-1-cyclohexenyl)-2-naphthyloxyacetic acid separates and is isolated.

EXAMPLE 20

*2-methyl-2-[6-(3-acetyl-3-acetoxycyclohexyl)-2-naphthyloxy]-propionic acid*

To a solution of 2-methyl-2-[6-(3-hydroxy-3-ethynylcyclohexyl)-2-naphthyloxy]propionic acid (3.52 g., 0.01 mole), prepared as described in Example 16, in acetic acid (10 ml.), is added mercuric acetate (0.15 g.) and the mixture refluxed for 5 hours and then maintained at 70° for 17 hours. The mixture is diluted wath water and the product extracted with ether. The ether extract is then dried over sodium sulfate and concentrated to yield 2 g. of 2-methyl-2 - [6-(3-acetyl-3-acetoxycyclohexyl)-2-naphthyloxy]propionic acid.

EXAMPLE 21

*2-methyl-2-[6-(3-hydroxy-3-acetylcyclohexyl)-2-naphthyloxy]propionic acid*

A solution of 2 - methyl - 2 - [6 - (3-hydroxy-3-ethynylcyclohexyl)-2-naphthyloxy]propionic acid (3.52 g., 0.01 mole), prepared as described in Example 16, in water (20 ml.) and sulfuric acid (1 g., 0.01 mole) is added to a mixture of water (20 ml.), mercuric oxide (0.24 g.) and sulfuric acid (0.5 ml.). After heating at 100° C. for two hours, the solution is cooled and the product extracted with ether. The ether extract is dried over sodium sulfate and concentrated to yield 2-methyl-2-[6-(3-hydroxy-3-acetylcyclohexyl)-2-naphthyloxy]propionic acid.

EXAMPLE 22

*2-methyl-2-[6-[3-hydroxy-3-(1-hydroxyethyl) cyclohexyl]-2-naphthyloxy]propionic acid*

To a solution of 2-methyl-2-[6-(3-hydroxy-3-acetylcyclohexyl) - 2 - naphthyloxy]propionic acid (8.9 g., 0.24 mole), prepared as described in Example 21, in 200 ml. of methanol is added 0.03 mole of sodium hydroxide in 5.0 ml. of water. A solution of 0.06 mole potassium borohydride in 40 ml. of water containing 0.25 ml. of 10% sodium hydroxide is added dropwise. The solution is stirred for seven hours. The solvent is removed under reduced pressure and the residue treated with dilute hydrochloric acid and ether. The ether layer is separated and concentrated to give 2 - methyl - 2 - [6 - [3 - hydroxy-3- (1 - hydroxyethyl)cyclohexyl] - 2 - naphthyloxy]propionic acid.

EXAMPLE 23

*2-methyl-2-[6-(3-methylenecyclohexyl)-2-naphthyloxy]propionic acid*

A solution of the methyl ester of 2-methyl-2-[6-(3-oxocyclohexyl)-2-naphthyloxy]propionic acid (7.13 g., 0.023 mole), prepared by the reaction of the 2-methyl-2-[6-(3-oxocyclohexyl)-2-naphthyloxy]propionic acid of Example 4 with methanol in ether (75 ml.), is added to triphenylphosphinemethylene (0.03 mole) in ether (100 ml.). The reaction mixture is stirred for 48 hours at 25° C. and filtered. The filtrate is concentrated to an oil which is evaporatively distilled at 220° C. and 0.2 mm. to yield 3 g. of the methyl ester of 2-methyl-2-[6-(3-methylenecyclohexyl)-2-naphthyloxy]propionic acid. The esterified product thus produced is treated with an aqueous solution of sodium hydroxide and then acidified in 1N hydrochloric acid to yield 2-methyl-2[6-(3-methylenecyclohexyl)-2-naphthyloxy]propionic acid.

EXAMPLE 24

*2-methyl-2-[6-(3-cyanomethylenecyclohexyl)-2-naphthyloxy]propionic acid*

A solution of the ethyl ester of 2-methyl-2-[6-(3-methylenecyclohexyl)-2-naphthyloxy]propionic acid (6.48 g., 0.02 mole), prepared by the reaction of the 2-methyl-2-[6-(3-methylenecyclohexyl) - 2 - naphthyloxy]propionic acid of Example 23 with ethanol in ether (75 ml.), is added to triphenylphosphinecyanomethylene (0.03 mole) in ether (100 ml.). The reaction mixture is refluxed for 65 hours and then filtered. The filtrate is diluted with water and the ether layer is dried over sodium sulfate and concentrated to yield the ethyl ester of 2-methyl-2-[6-(3-cyanomethylenecyclohexyl) - 2 - naphthyloxy]propionic acid. The esterified product thus produced is then treated with an aqueous solution of sodium carbonate and then acidified with 1N hydrochloric acid to obtain 2-methyl-2- [6 - (3 - cyanomethylenecyclohexyl) - 2 - naphthyloxy] propionic acid.

EXAMPLE 25

*6-(1-cyclohexenyl)-2-naphthyloxyacetic acid*

By substituting 2 - (1 - cyclohexenyl) - 6 - hydroxynaphthalene for the 3-(6-hydroxy-2-naphthyl)-2-cyclohexen - 1 - one of Example 1 and following substantially the procedure described therein, the product 6-(1-cyclohexenyl)-2-naphthyloxyacetic acid is prepared.

EXAMPLE 26

*2-methyl-2-[6-(3-hydroxy-1-cyclopentenyl)-2-naphthyloxy]propionic acid*

By substituting 3 - (6-hydroxy - 2-naphthyl)-2-cyclopenten-1-ol for the 3 - (6 - hydroxy - 2 - naphthyl)cyclohexanol of Example 3 and following substantially the procedure described therein, the product 2-methyl-2-[6- (3-hydroxy-1-cyclopentyl)-2-naphthyloxy]propionic acid is prepared.

EXAMPLE 27

*4-[6(2-ethyl-3-oxo-1-cyclopentyl)-2-naphthyloxy] butanoic acid*

*Step A: 6 - bromoacetyl - 2 - methoxynaphthalene.—* A solution of 100.11 g. (0.5 mole) of 2-acetyl-6-methoxynaphthalene in 1200 ml. of methylene chloride is cooled up to —10° C. and 79.91 g. (0.5 mole) of bromine in 300 ml. of methylene chloride and 320 ml. of p-dioxane is added to the solution with stirring over a four-hour period. The resulting mixture is stirred for 1½ hours as the temperature rises to 25° C. and the mixture is then poured into two liters of water. The organic layer is separated, washed with water, dried and concentrated under reduced pressure. The oily residue is washed with hexane and recrystallized from butyl chloride to give 59.0 g. of a yellow solid, identified as 6-bromoacetyl-2-methoxynaphthalene, M.P. 101–106.5° C. Repeated recrystallization from butyl chloride raises the melting point of the product to 109–112° C.

*Analysis.*—For $C_{13}H_{11}BrO_2$: Calculated: C, 55.94; H, 3.97. Found: C, 55.93; H, 3.99.

*Step B: Ethyl 2-butyryl-3-(6-methoxy-2-naphthoyl)-propionate.—*A solution of 16.9 g. (0.107 mole) of ethyl butyroacetate in 225 ml. of benzene is heated to reflux and 7.05 g. (0.107 mole) of 85% potassium hydroxide pellets is added. The mixture is heated at reflux for three hours as the water is removed by a Dean-Stark trap. Then 26.0 g. (0.0932 mole) of 6-bromoacetyl-2-methoxynaphthalene in 100 ml. of benzene is added. Reflux is continued for four hours. The cooled reaction mixture is washed with water, dried, and filtered through charcoal. Concentration of the benzene solution under reduced pressure gives 31.6 g. of orange solid. Recrystallization from isopropanol gives a white solid, identified as ethyl 2-butyryl-3-(6-methoxy-2-naphthoyl)propionate, M.P. 90–96° C.; weight 24.15 g. Repeated recrystallization from isopropanol raises the melting point of the product to 97.5–99° C.

*Analysis.*—for $C_{21}H_{24}O_5$: Calculated: C, 70.76; H, 6.79. Found: C, 70.50; H, 6.84.

*Step C: 2-ethyl - 3 - (6-methoxy-2-naphthyl)-2-cyclopenten-1-one.—*Ethyl 2 - butyryl - 3 - (6-methoxy - 2-naphthoyl)propionate (13.95 g., 0.392 mole) is heated at reflux under nitrogen with 50 ml. of ethanol and 200 ml. of 5% sodium hydroxide for three hours. The mixture is cooled and extracted with ether. The ether extract is washed with water, dried over anhydrous sodium sulfate and concentrated to give 8.54 g. of 2-ethyl-3-(6-methoxy- 2 - naphthyl) - 2 - cyclopenten - 1 - one in the form of a yellow solid, M.P. 86–96° C. Repeated recrystallization from isopropanol or isopropyl ether raises the melting point of the product to 101–102.5° C.

*Analysis.*—For $C_{18}H_{18}O_2$: Calculated: C, 81.17; H 6.81. Found: C, 80.65; H, 6.91.

*Step D: 2 - ethyl - 3 - (6-hydroxy - 2 - naphthyl)-2-cyclopenten-1-one.—*A solution of 5.0 g. (0.0188 mole) of 2 - ethyl - 3 - (6 - methoxy - 2 - naphthyl) - 2-cyclopenten-1-one in 100 ml. of xylene and 2 ml. of dimethylformamide is heated to 90–100° C. under nitrogen. Then 10.0 g. (0.075 mole) of aluminum chloride is added quickly with rapid stirring. Reflux begins immediately and the mixture is stirred at reflux for six minutes. The hot mixture is poured into 300 g. of ice and 35 ml. of concentrated hydrochloric acid. After stirring for several minutes the mixture is filtered and the yellow solid thus obtained is recrystallized from acetonitrile to give 3.45 g. of 2-ethyl - 3 - (6 - hydroxy - 2 - naphthyl) - 2 - cyclopenten-1-one, M.P. 194–197° C.; yield 73%. Further recrystallization from acetonitrile raises the melting point of the product to 197–198.5° C.

*Analysis.*—For $C_{17}H_{16}O_2$: Calculated: C, 80.92; H, 6.39. Found: C, 81.03; H, 6.57.

*Step E: 4 - [6 - (2 - ethyl - 3 - oxo - 1 - cyclopentenyl) 2-naphthyloxy]butanoic acid.*—By substituting 2-ethyl-3- (6 - hydroxy - 2 - naphthyl) - 2 - cyclopenten-1-one and ethyl 4-bromobutanoate for the 3 - (6 - hydroxy - 2- naphthyl) - 2 - cyclohexen-1-one and ethyl bromoacetate, respectively, of Example 1 and following substantially the same procedure described therein, the product 4-[6- (2 - ethyl - 3 - oxo - 1 - cyclopentenyl) - 2 - naphthyloxy]butanoic acid is prepared.

EXAMPLE 28

*6-(2,4-dimethyl-3-oxo-1-cyclopentenyl)-2-naphthyloxypropionic acid*

*Step A: 3 - (6 - hydroxy - 2 - naphthyl) - 2,5-dimethyl-2-cyclopenten-1-one.*—By substituting ethyl 2 - methyl - 3- oxovalerate for the ethyl butyroacetate of Example 27, Step B and following substantially the procedure described in Steps B, C and D of that example, the compound 3- (6 - hydroxy - 2 - naphthyl) - 2,5 - dimethyl - 2 - cyclopenten-1-one is prepared. Upon recrystallization from methanol the purified product melts at 177–170° C.

*Step B: 6-(2,4 - dimethyl - 3 - oxo - 1 - cyclopentenyl) 2 - naphthyloxypropionic acid.*—By substituting 3 - (6- hydroxy - 2 - naphthyl) - 2,5 - dimethyl - 2 - cyclopenten-1-one and ethyl bromopropionate for the 3 - (6 - hydroxy-2 - naphthyl) - 2 - cyclohexen-1-one and ethyl bromoacetate of Example 1 and following substantially the same procedure described therein the product 6 - (2,4-dimethyl-3 - oxo - 1 - cyclopentenyl) - 2 - naphthyloxypropionic acid is prepared.

The products 6 - (2-methyl - 3 - oxo - 1 - cyclohexenyl) 2 - naphthyloxyacetic acid, 6 - (6 - methyl - 3 - oxo-1- cyclohexenyl) - 2 - naphthyloxyacetic acid and 6 - (4- ethyl - 3 - oxo - 1 - cyclohexenyl) - 2 - naphthyloxyacetic acid are also prepared by substituting 3 - (6-hydroxy 2 - naphthyl) - 2 - methyl - 2 - cyclohexen-1-one, 3 - (6 - hydroxy - 2 - naphthyl) - 6 - methyl-2-cyclohexen-1-one and 3 - (6 - hydroxy - 2 - naphthyl) - 4-ethyl-2-cyclohexen-1-one for the 3 - (6 - hydroxy - 2 - naphthyl) 2-cyclohexen-1-one of Example 1 and following substantially the procedure described therein.

EXAMPLE 29

*(1-chloro-6-cyclohexyl-2-naphthyloxy)acetic acid*

*Step A: 1 - chloro - 6 - cyclohexyl - 2 - naphthol.*— Tertiary butyl hypochlorite (5.43 g., 0.05 mole) is added to a well-stirred suspension of 6 - cyclohexyl - 2-naphthol (11.31 g., 0.05 mole) in 50 ml. of carbon tetrachloride. The clear solution is heated under reflux for 15 minutes and then concentrated under reduced pressure to yield 1 - chloro - 6 - cyclohexyl - 2 - naphthol which is purified by recrystallization from alcohol and then benzene, M.P. 107–110° C.

*Step B: (1 - chloro - 6 - cyclohexyl - 2 - naphthyloxy) acetic acid.*—By substituting 1 - chloro - 6 - cyclohexyl-2 - naphthol for the 3 - (6 - hydroxy - 2 - naphthyl)-2-cyclohexen-1-one of Example 1 and following substantially the procedure described therein, the compound (1- chloro - 6 - cyclohexyl - 2 - naphthyloxy)acetic acid is prepared.

EXAMPLE 30

*2-methyl-2-(1-chloro-6-cyclohexyl-2-naphthyloxy) propionic acid*

By substituting 1 - chloro - 2 - hydroxy - 6 - cyclohexylnaphthalene for the 6 - cyclohexyl - 2 - naphthol of Example 2 and following substantially the procedure described therein, the product 2 - methyl - 2 - (1 - chloro-6 - cyclohexyl - 2 - naphthyloxy)propionic acid is prepared.

EXAMPLE 31

*2 - methyl - 2 - [6 - (3 - oxocyclohexyl) - 1 - chloro-2-naphthyloxy]propionic acid*

*Step A: 3 - (6 - hydroxy - 5 - chloro - 2 - naphthyl) cyclohexanone.*—By substituting 3 - (6 - hydroxy - 2- naphthyl)cyclohexanone for the 6 - cyclohexyl-2-naphthol of Example 29, Step A and following substantially the procedure described therein, the compound 3 - (6 - hydroxy - 5 - chloro - 2 - naphthyl)cyclohexanone is prepared, M.P. 149–153° C.

*Step B: 2 - methyl - 2 - [6 - (3 - oxocyclohexyl)-1-chloro - 2 - naphthyloxy]propionnc acid.*—By substituting 3 - (6 - hydroxy - 5 -chloro - 2 - naphthyl)cyclohexanone for the 6 - cyclohexyl - 2 - naphthol of Example 2 and following substantially the procedure described therein, the product 2 - methyl - 2 - [6-(3-oxocyclohexyl) 1-chloro-2-naphthyloxy]propionic acid is prepared.

Similarly, by substituting 3 - (6 - hydroxy-2-naphthyl) 2 - cyclohexen - 1 - one for the 6 - cyclohexyl-2-naphthol of Example 29, Step A, and following substantially the procedure described in Steps A and B of that example, the product [6 - (3 - oxo - 1 - cyclohexenyl) - 1 - chloro-2-naphthyloxy]acetic acid is prepared.

EXAMPLE 32

*2-methyl-2-[6-(3-hydroxycyclohexyl)-1-chloro-2-naphthyloxy]propionic acid*

To a solution of 2-methyl-2-[6-(3-oxocyclohexyl)-1-chloro-2-naphthyloxy]propionic acid (8.66 g., 0.024 mole), prepared by the procedure of Example 31, in 200 ml. of methanol, is added 0.03 mole of sodium hydroxide in 5 ml. of water. A solution of 0.06 mole of potassium borohydride in 40 ml. of water containing 0.25 ml. of a 10% sodium hydroxide solution is added dropwise. The solution is stirred for seven hours. The solvent is removed under reduced pressure and the residue treated with dilute hydrochloric acid and ether. The ether layer is separated and concentrated and the residue is crystallized from dipropyl ketone to give 2-methyl-2-[6- (3-hydroxycyclohexyl)-1-chloro-2-naphthyloxy]propionic acid.

Similarly, by substituting [6-(3-oxo-1-cyclohexenyl)-1- chloro-2-naphthyloxy]acetic acid for the 2-methyl-2-[6- (3-oxocyclohexyl)-1-chloro-2-naphthyloxy]propionic acid of Example 32 and following substantially the procedure described therein, the product [6-(3-hydroxy-1-cyclohexenyl)-1-chloro-2-naphthyloxy]acetic acid is prepared.

EXAMPLE 33

*2-methyl-2-[6-(2-ethyl-6-methyl-3-oxo-1-cyclohexenyl)-2-naphthyloxy]propionic acid*

*Step A: 2-(α-methyl-β - dimethylaminopropionyl) - 6- methoxynaphthalene.* A mixture of 2-propionyl-6-methoxy naphthalene (2.14 g., 0.01 mole), dimethylamine hydrochloride (0.90 g., 0.011 mole), paraformaldehyde (0.014 mole) in 100 ml. of ethanol and five drops of concentrated hydrochloric acid are refluxed for 48 hours and concentrated to dryness in vacuo to obtain 2-(α-methyl-β-dimethylaminopropionyl)-6-methoxynaphthalene. Recrystallization from ethylene dichloride yields pure 2-(α-methyl-β-dimethylaminopropionyl) - 6-methoxynaphthalene which melts at 180–181° C.

*Step B: 2-ethyl-4-methyl-3-(6-methoxy-2-naphthyl)-2- cyclohexen-1-one.* A solution of potassium hydroxide (11.2 g., 0.2 mole) in 200 ml. of isopropyl alcohol is added over 25 minutes to 2-(α-methyl-β-dimethylaminopropionyl)-6-methoxynaphthalene (20.6 g., 0.066 mole) and ethyl butyroacetate (11,2 g., 0.072 mole) in 100 ml. of isopropyl alcohol. The reaction mixture is heated under reflux for 70 hours, concentrated under reduced pressure and then water is added. The insoluble oil thus obtained is extracted with ether and the resulting solution is washed with water, dried and then concentrated. The residual oil is distilled and 2-ethyl-4-methyl-3-(6-methoxy-2-naphthyl)-2-cyclohexen-1-one is collected at 220–225° C. at 0.3 mm.

*Step C: 2-ethyl-4-methyl-3-(6-hydroxy-2-naphthyl)-2-cyclohexen - 1 - one.* 2-ethyl-4-methyl - 3 - (6-methoxy-2-naphthyl)-2-cyclohexen-1-one (5.0 g., 0.02 mole) and aluminum chloride (5.0 g., 0.0375 mole) in 65 ml. of xylene is heated under reflux for seven minutes and then poured into 60 ml. of concentrated hydrochloric acid containing 200 g. of ice. The insoluble oil is extracted with ether and the ether extract thus obtained is concentrated to yield 3.5 g. of an oily product which is crystallized from a mixture of ethanol and water to yield 2-ethyl-4-methyl-3-(6-hydroxy-2-naphthyl)-2-cyclohexen-1-one which melts at 137–139° C.

*Step D: 2-methyl-2-[6-(2-ethyl-6-methyl-3-oxo-1-cyclohexenyl)-2-naphthyloxy]propionic acid.* By substituting 2-ethyl-4-methyl-3-(6-hydroxy-2-napthyl)-2 - cyclohexen-1-one for the 3-(6-hydroxy-2-napthyl)cyclohexanone of Example 4 and following substantially the procedure described therein, the product 2-methyl-2-[6-(2-ethyl-6-methyl-3-oxo-1-cyclohexenyl) - 2 - napthyloxy]propionic acid is obtained.

EXAMPLE 34

*2-methyl-2-[6-(2,4-dimethyl-3-oxo-1-cyclohexenyl)-2-naphthyloxy]propionic acid*

*Step A: 2,6-dimethyl-3-(6-methoxy-2-naphthyl)-2-cyclohexen-1-one.* A solution of 16.8 g. (0.3 mole) of potassium hydroxide in 300 ml. of isopropyl alcohol is prepared by warming the two reagents in a flask protected from atmospheric moisture. This solution is cooled and added dropwise over a one-hour period to a rapidly stirred mixture of 2-(β-dimethylaminopropionyl)-6-methoxynaphthalene hydrochloride (29.38 g., 0.1 mole), ethyl 2-methyl-3-oxovalerate (17.4 g., 0.11 mole) and 150 ml. of isopropyl alcohol. Salts precipitate and the mixture becomes viscous. The mixture is stirred at reflux for 66 hours and then concentrated under reduced pressure at 40–50° C. until all of the solvent is removed. Water (250 ml.) is added to the residual solid and, after vigorous agitation, the insoluble material is collected by filtration. The moist solid is dissolved in ether, the solution is extracted with dilute hydrochloric acid and water and then dried and concentrated. An 83.3% yield of 2,6-dimethyl-3-(6-methoxy-2-naphthyl) - 2-cyclohexen-1-one is obtained which melts at 80–94° C. Recrystallization from isopropyl alcohol yields pure 2,6-dimethyl-3-(6-methoxy-2-naphthyl)-2-cyclohexen-1-one melting at 96–98.5° C.

*Step B: 2,6-dimethyl-3-(6-hydroxy-2-naphthyl)-2-cyclohexen-1-one.* 2,6-dimethyl-3-(6-methoxy-2-naphthyl)-2-cyclohexen-1-one (18.2 g., 0.065 mole) is dissolved in a mixture of 375 ml. of xylene and 7.5 ml. of dimethylformamide and heated at 100° C. Anhydrous aluminum chloride (33.3 g., 0.25 mole) is added and the mixture is stirred and heated at reflux for seven minutes. The mixture is poured into 120 ml. of concentrated hydrochloric acid containing 500 g. of ice and resulting solid is collected. Recrystallization of the solid from methyl alcohol yields 2,6-dimethyl-3-(6-hydroxy-2-naphthyl)-2-cyclohexen-1-one which melts at 198–200° C.

*Step C: 2-methyl-2-[6-(2,4-dimethyl-3-oxo-1-cyclohexenyl)-2-naphthyloxy]propionic acid.* By substituting, 2,6-dimethyl-3-(6-hydroxy-2 - naphthyl)-2 - cyclohexen-1-one for the 3-(6-hydroxy-2-naphthyl)cyclohexanone of Example 4 and following substantially the procedure described therein, the product 2-methyl-2-[6-(2,4-dimethyl-3-oxo-1-cyclohexenyl)-2-naphthyloxy]propionic acid is obtained.

By substituting the appropriate naphthol (II) and halo substituted alkanoate reactants for the 3-(6-hydroxy-2-naphthyl)-2-cyclohexen-1-one and ethyl bromoacetate of Example 1 and by following substantially the same procedure described therein, the products described in Table I, infra, are prepared. The following equation illustrates the reaction of said Example 1 and together with the accompanying table depicts the starting materials employed therein.

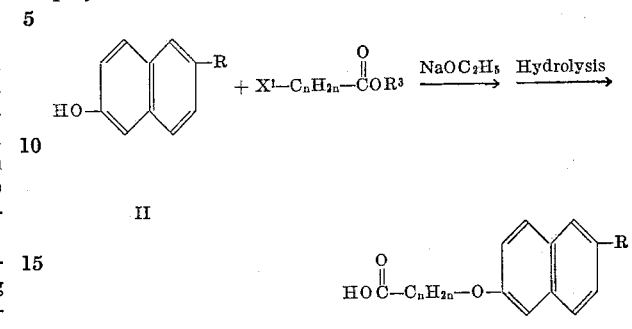

II

TABLE I

| Ex. | $-C_nH_{2n}-$ | R | $R^3$ | $X^1$ |
|---|---|---|---|---|
| 35 | $-CH_2-$ | (S-heterocycle) | $-C_2H_5$ | Br |
| 36 | $-CH_2-CH_2-$ | $CH_3-$ (H, OH substituted S-heterocycle) | $-CH_3$ | Cl |
| 37 | $-CH(CH_3)-$ | (O, S-heterocycle) | $-CH_3$ | Br |
| 38 | $-CH(CH_3)-CH_2-$ | (H, OH substituted S-heterocycle) | $-C_2H_5$ | Cl |
| 39 | $-CH_2-$ | (H, OH substituted heterocycle) | $-C_3H_7$ | Br |
| 40 | $-CH_2-CH_2-CH_2-$ | (heterocycle) | $-C_3H_7$ | Br |
| 41 | $-CH_2-(CH_2)_2-CH_2-$ | $CH_3-$ (O-heterocycle) | $-C_2H_5$ | Cl |
| 42 | $-C(C_2H_5)(CH_3)-$ | $CH_3-$ (O, S-heterocycle) | $-CH_3$ | Cl |
| 43 | $-CH_2-$ | $CH_3-$ (H, OH substituted S-heterocycle) | $-CH_3$ | Cl |
| 44 | $-CH_2-CH_2-$ | $CH_3-$ (H, OH substituted heterocycle) | $-C_2H_5$ | Br |

TABLE I.—Continued

| Ex. | —C_nH_{2n}— | R | R³ | X¹ |
|---|---|---|---|---|
| 45 | $-\underset{\underset{CH_3}{|}}{\overset{\overset{C_2H_5}{|}}{C}}-$ | CH₃-[cyclopentene] | —C₂H₅ | Br |
| 46 | —CH₂— | CH₃-[thiophene] | —C₂H₅ | Br |
| 47 | —CH₂—(CH₂)₂—CH₂— | [cyclopentenone]-C₂H₅ | —C₂H₅ | Cl |
| 48 | $-\underset{\underset{CH_3}{|}}{CH}-$ | [H,OH-thiolane]-C₂H₅ | —C₄H₉ | I |
| 49 | —CH₂— | [H,Br-thiolane] | —C₂H₅ | I |
| 50 | —CH₂—CH₂—CH₂— | [H,Cl-thiolane] | —CH₃ | Br |
| 51 | —CH₂—CH₂— | [H,I-thiolane] | —CH₃ | Cl |
| 52 | —CH₂— | [H,F-thiolane] | —C₃H₇ | I |
| 53 | —CH₂—CH₂— | [H,Br-thiolane]-C₂H₅ | —C₂H₅ | Br |
| 54 | —CH₂— | [cyclohexenone]-C₃H₇ | —C₂H₅ | Br |
| 55 | $-\underset{\underset{CH_3}{|}}{\overset{\overset{CH_3}{|}}{C}}-$ | [cyclohexenone]-CH₃ | —CH₃ | I |
| 56 | —CH₂— | [cyclohexenone]-C₄H₉ | —C₂H₅ | Br |
| 57 | $-\underset{\underset{CH_3}{|}}{\overset{\overset{CH_3}{|}}{C}}-$ | [H,OH-thiane]-C₃H₇ | C₃H₇ | Cl |
| 58 | —CH₂—CH₂—CH₂— | [H,OH-cyclohexene]-C₃H₇ | —C₄H₉ | Br |
| 59 | $-\underset{\underset{CH_3}{|}}{CH}-$ | [thiane-one]-C₃H₇ | —CH₃ | Cl |
| 60 | —CH₂— | [H,OH-thiane]-CH₃ | —C₃H₇ | Cl |
| 61 | —CH₂—CH₂— | [H,OH-cyclohexene]-C₄H₉ | —C₂H₅ | Br |
| 62 | $-\underset{\underset{CH_3}{|}}{CH}-CH_2-$ | [H,OH-cyclohexene]-CH₃ | —CH₃ | Cl |
| 63 | —CH₂—CH₂— | [thiane-one]-CH₃ | —C₂H₅ | Cl |
| 64 | —CH₂— | [H,OH-thiane]-C₄H₉ | —C₂H₅ | Br |
| 65 | —CH₂— | [thiane-one]-C₄H₉ | —CH₃ | Br |
| 66 | $-CH_2-\underset{\underset{CH_3}{|}}{CH}-CH_2-$ | C₂H₅-[cyclohexenone] | —C₂H₅ | Cl |
| 67 | —CH₂—CH₂—CH₂— | CH₃-[thiane-one]-C₃H₇ | —C₃H₇ | Cl |
| 68 | —CH₂—CH₂— | C₂H₅-[thiane-one] | —C₂H₅ | I |
| 69 | $-\underset{\underset{CH_3}{|}}{CH}-$ | CH₃-[H,OH-thiane] | —CH₃ | Br |

TABLE I—Continued

| Ex. | —CₙH₂ₙ— | R | R³ | X¹ |
|---|---|---|---|---|
| 70 | —CH₂— | (cyclohexenol, C₂H₅, H, OH) | —C₂H₅ | Cl |
| 71 | —CH₂— | (cyclohexenol, CH₃, H, OH) | —C₃H₇ | Br |
| 72 | —CH₂— | (thiacyclohexanol, C₂H₅, H, OH, S) | —C₂H₅ | Br |
| 73 | —CH₂—CH₂— | (thiacyclohexane, H, Br, S) | —CH₃ | Cl |
| 74 | —CH—CH₂—<br>   \|<br>   CH₃ | (thiacyclohexane, H, Cl, S) | —CH₃ | I |
| 75 | —CH₂—CH—<br>         \|<br>         CH₃ | (thiacyclohexane, H, I, S) | —C₃H₇ | Br |
| 76 | —CH₂—CH₂— | (thiacyclohexane, H, F, S) | —C₄H₉ | Br |
| 77 | —CH—<br>   \|<br>   C₂H₅ | (cyclohexenone, CH₃) | —CH₃ | Cl |
| 78 | —CH₂— | (thiacyclohexanone, CH₃, S) | —C₂H₅ | Cl |
| 79 | —CH—<br>   \|<br>   C₃H₇ | (thiacyclohexanol, CH₃, H, OH, S) | —C₂H₅ | Br |
| 80 | —CH₂— | (cyclohexenol, C₃H₇, H, OH) | —C₃H₇ | Br |
| 81 | —CH₂—CH—CH₂—<br>            \|<br>            CH₃ | (thiacyclohexanone, C₂H₅, S) | —C₂H₅ | Cl |
| 82 | —CH₂—CH₂— | (thiacyclohexanol, C₃H₇, H, OH, S) | —C₂H₅ | Br |
| 83 | —CH₂— | (thiacyclohexanol, C₂H₅, H, OH, S) | —C₄H₉ | I |
| 84 | —CH₂—CH₂—CH₂— | (cyclohexenone, C₃H₇) | —CH₃ | Br |
| 85 | —CH₂— | (cyclohexenol, CH₃, H, OH) | —CH₃ | Br |
| 86 | —C(CH₃)(C₂H₅)— | (cyclohexenone, C₂H₅) | —C₂H₅ | Cl |
| 87 | —CH₂— | (thiacyclohexanone, C₃H₇, S) | —C₂H₅ | Br |
| 88 | —CH₂—CH₂— | (thiacyclohexanol, C₂H₅, H, OH, S) | —CH₃ | Br |
| 89 | —CH₂— | (thiacyclohexanone, CH₃, S) | —C₃H₇ | I |
| 90 | —CH₂—CH₂— | (thiacyclohexanol, CH₃, H, OH, S) | —C₃H₇ | Br |
| 91 | —CH₂— | (cyclohexenol, CH₃, H, OH) | —C₂H₅ | Cl |
| 92 | —CH₂—CH₂— | (thiacyclohexanone, CH₃, CH₃, S) | —CH₃ | Br |

TABLE I—Continued

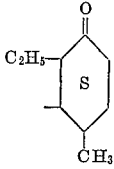

In the foregoing Table I each of the radicals designated as —$C_2H_5$, —$C_3H_7$ and —$C_4H_9$ represent the groups ethyl, n-propyl and n-butyl, respectively.

There is no clear agreement about the actual role of cholesterol synthesis in the localization of atherosclerotic plaques but numerous studies support the concept that cholesterol plays a major role in the pathogenesis of atherosclerosis because, along with lipids and fibrin, it is the substance that accumulates in the arterial intima and subintima and produces arterial corrosion.

We have now found that the serum cholesterol level in the body may be significantly decreased by administering pharmaceutical amounts of the instant products (I) either by oral administration in the form of a tablet or by intravenous injection. The dosage of the naphthyloxy-alkanoic acids (I) may be varied over a wide range and for this purpose scored tablets containing 25, 50, 100, 150, 250 and 500 milligrams of the active ingredient may be made available to the physician for the symptomatic adjustment of the dosage to the individual patient. These dosages are well below the toxic or lethal dose of the compounds (I).

It is apparent from the foregoing description that the naphthyloxy-alkanoic acids (I) of the invention constitute a valuable class of compounds which have not been prepared heretofore. One skilled in the art will also appreciate that the processes disclosed in the above examples are merely illustrative and are capable of wide variation and modification without departing from the spirit of this invention.

What is claimed is:

1. A member selected from the group consisting of a compound of the formula:

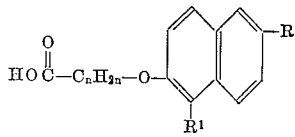

wherein R is a cycloaliphatic radical which may either be unsubstituted or contain one or more nuclear substituents selected from the group consisting of methylene, cyanomethylene, hydroxy, halogen, lower alkyl, lower alkenyl, lower alkynyl, cyano, hydroxy-alkyl, lower alkanoyl, polyfluoro substituted alkenyl, lower alkanoyloxy and oxo; $R^1$ is a member selected from the group consisting of hydrogen and halogen; and —$C_nH_{2n}$— is a lower alkylene radical containing from one to four carbon atoms; and the nontoxic, pharmacologically acceptable acid addition salts thereof.

2. A compound of the formula:

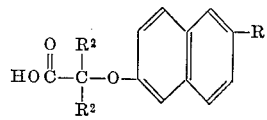

wherein R is a member selected from the group consisting of cycloalkyl, hydroxy substituted cycloalkyl and oxo substituted cycloalkyl and each of the $R^2$ radicals represents similar or dissimilar substituents selected from the group consisting of hydrogen and lower alkyl.

3. A compound of the formula:

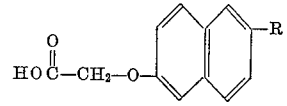

wherein R is cycloalkyl.

4. A compound of the formula:

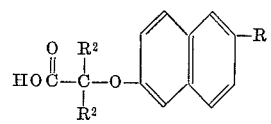

wherein R is cycloalkyl and each of the $R^2$ radicals is a lower alkyl group.

5. A compound of the formula:

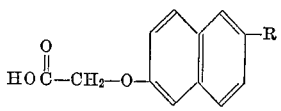

wherein R is hydroxy substituted cycloalkyl.

6. A compound of the formula:

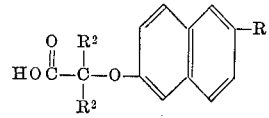

wherein R is hydroxy substituted cycloalkyl and each of the $R^2$ radicals is a lower alkyl group.

7. A compound of the formula:

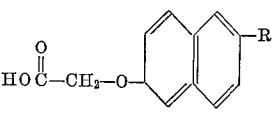

wherein R is oxo substituted cycloalkyl.

8. A compound of the formula:

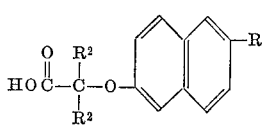

wherein R is oxo substituted cycloalkyl and each of the $R^2$ radicals is a lower alkyl group.

9. 6-(3-oxo-1-cyclohexenyl)-2-naphthyloxyacetic acid.

10. 2 - methyl-2-(6-cyclohexyl-2-naphthyloxy) - propionic acid.

11. 2 - methyl-2-[6-(3-hydroxycyclohexyl)-2-napthyloxy]propionic acid.

12. 2 - methyl - 2 - [6-(3-oxocyclohexyl)-2-napthyloxy]-propionic acid.

13. 2 - methyl-2-[6-(3-hydroxy-3-methylcyclohexyl)-2-naphthyloxy]propionic acid.

14. 2 - methyl-2-[6-(3-hydroxy-3-ethynyl-cyclohexyl)-2-naphthyloxy]propionic acid.

References Cited

UNITED STATES PATENTS 2,198,293    4/1940    Reiff et al. _____ 260—520 X

RICHARD K. JACKSON, *Primary Examiner.*

S. WILLIAMS, *Assistant Examiner.*